United States Patent [19]
Otsuka et al.

[11] Patent Number: 5,841,557
[45] Date of Patent: Nov. 24, 1998

[54] METHOD AND APPARATUS FOR SCRAMBLING THE POLARIZATION OF SIGNAL LIGHTS FORMING A WAVELENGTH DIVISION MULTIPLEXED SIGNAL LIGHT

[75] Inventors: Kazue Otsuka; Hiroshi Onaka; Takafumi Terahara; Takao Naito, all of Kawasaki, Japan

[73] Assignee: Fujitsu Limited, Kawasaki, Japan

[21] Appl. No.: 734,605

[22] Filed: Oct. 22, 1996

[30] Foreign Application Priority Data

Nov. 17, 1995 [JP] Japan ................................. 7-300303

[51] Int. Cl.$^6$ .................................................. H04J 14/06
[52] U.S. Cl. ........................... 359/122; 359/156; 359/124
[58] Field of Search ................................... 359/122, 123, 359/124, 156, 181, 192

[56] References Cited

U.S. PATENT DOCUMENTS

| | | | |
|---|---|---|---|
| 5,345,331 | 9/1994 | Bergano et al. | 359/341 |
| 5,410,624 | 4/1995 | Morkel | 385/24 |
| 5,657,151 | 8/1997 | Swan et al. | 359/181 |

FOREIGN PATENT DOCUMENTS

| | | |
|---|---|---|
| 0-717523 A2 | 6/1996 | European Pat. Off. |
| 0-717524 A2 | 6/1996 | European Pat. Off. |
| 6-308547 | 11/1994 | Japan . |
| 2-284677 | 6/1995 | United Kingdom . |

OTHER PUBLICATIONS

Neal S. Bergano and C.R. Davidson, "Four–Channel WDM Transmission Experiment Over Transoceanic Distances," Optical Amplifier and their Applications '94, pp. PD7–2–PD7–5, Aug. 3, 1994.

Neal S. Bergano et al., "40 GB/S WDM Transmission of Eight 5 GB/S Data Channels Over Transoceanic Distances Using the Conventional NRZ Modulation Format." Optical Fiber Communication '95, pp. PD19–1–PD19–5, Feb. 28, 1995.

Neal S. Bergano, "Time Dynamics of Polarization Hole Burning in An EDFA," Optical Fiber Communication '94 Technical Digest, FF4, pp. 305–306, Feb. 20, 1994.

R.E. Wagner, "Multiwavelength Optical Networks," presented at OFC Conference San Jose Convention Center, San Jose, CA, Feb. 26, 1996.

T. Naito et al., "Four 5–Gbit/s WDM transmission over 4760–km straight–line using pre–and–post–dispersion compensation and FWM cross talk reduction," OFC '96 Technical Digest, Feb. 25, 1996.

F. Heismann et al., "Electrooptic Polarization scramblers For Optically Amplified Long–Haul Transmission Systems" 20th European Conference on Optical Communications Proceedings, vol. 2, Sep. 25, 1994.

T. Terahara et al. "Suppression of Q Fluctuation and Degradation Due to Polarization–Dependent Loss and Gain Using Depolarized Optical Signals in Long Distance Optical Amplifier Systems," Optical Amplifiers and their Applications '94, Aug. 3, 1994.

Bergano et al., "Bit–Synchronous Polarization and Phase Modulation Scheme for Improving the Performance of Optical Amplifier Transmission Systems", Electronics Letters, $4^{th}$ Jan. 1996, vol. 32, No. 1, pp. 52–54.

*Primary Examiner*—Kinfe-Michael Negash
*Attorney, Agent, or Firm*—Staas & Halsey

[57] ABSTRACT

A method and apparatus for scrambling the polarization of signal lights combined into a wavelength division multiplexed signal light, to suppress non-linear optical effect and thereby improve transmission quality. For example, each signal light has a different polarization before being combined into a wavelength division multiplexed signal light. The polarization of the wavelength division multiplexed signal light can then be scrambled. Alternatively, the polarization of each signal light can be scrambled at a different scrambling frequency before being combined into the wavelength division multiplexed signal light.

42 Claims, 21 Drawing Sheets

METHOD AND APPARATUS FOR SCRAMBLING THE POLARIZATION OF SIGNAL LIGHTS FORMING A WAVELENGTH DIVISION MULTIPLEXED SIGNAL LIGHT

CROSS-REFERENCE TO RELATED APPLICATIONS

This application is based on, and claims priority to, Japanese patent application JP 07-300303, filed on Nov. 17, 1995, in Japan, and which is incorporated herein by reference.

BACKGROUND OF THE INVENTION

1. Field of the Invention

The present invention relates to a method and apparatus for scrambling the polarization of signal lights forming a wavelength division multiplexed signal light.

2. Description of the Related Art

To amplify a signal light, the following steps are typically performed: (a) the signal light is converted to an electrical signal, (b) the electrical signal is amplified, and (c) the amplified electrical signal is then converted back to an optical signal.

However, the invention of an erbium-doped fiber optical amplifier (EDF optical amplifier, or EDFA) employing an erbiumdoped fiber (EDF) allows a signal light to be directly amplified, without being converted into an electrical signal. Moreover, EDF optical amplifiers have a relatively wide gain wavelength band, and therefore allow a plurality of different signal lights (or "wavelength components") to be collectively amplified and repeated. For example, the different signal lights can be combined into a wavelength division multiplexed (WDM) signal light which is amplified by an EDF optical amplifier. Therefore, EDF optical amplifiers are enjoying widespread success in fiber optic communication systems.

Optical fibers are used as transmission lines in such fiber optical communication systems. Moreover, silica is a popular material used in optical fibers. Silica is a material having a very low non-linearity and, as a result, can be undesireably influenced by various non-linear optical effects. More specifically, a signal light transmitted in an optical fiber is typically confined to a very small region of approximately 10 Am in the optical fiber. Therefore, if a wavelength division multiplexed signal light is transmitted through the fiber, the power density in the small region of the fiber can become relatively high.

In addition, the length over which a signal light interacts with the material of the optical fiber is typically very long. Although an optical fiber made of silica yields relatively low loss and is limited in propagation mode, this long interaction length is a significant factor influencing the deterioration of the transmission quality of a wavelength division multiplexed signal light.

Non-linear optical effects of an optical fiber which have an influence on the transmission quality of a wavelength division multiplexed signal light include: (a) stimulated Brillouin scattering (SBS), (b) self phase modulation (SPM), (c) Raman scattering, (d) four wave mixing (FWM) and (e) cross phase modulation (XPM). Of these non-linear optical effects, the influence of FWM and XPM is dependent on the relationship between polarization conditions of individual signal lights in the wavelength division multiplexed signal light. Accordingly, if the polarization conditions of signal lights vary in a transmission line (that is, an optical fiber), then the signal to noise ratio (SNR) fluctuates with respect to time.

Moreover, as described in "IEEE J. Lightwave Technol., 6, No. 11, pp.1750–1769", FWM is the most difficult of the above-described non-linear optical effects to overcome when designing an optical communication system.

FIGS. 27(A) and 27(B) are graphs indicating the effect of FWM. Referring now to FIGS. 27(A) and 27(B), FWM light is signal light having a frequency $f_{ijk}$ and which is generated by light frequency mixing among three signal lights having frequencies $f_i$, $f_j$, $f_k$, respectively. The generation of the FWM light causes crosstalk with each of the original signal lights and thereby deteriorates the transmission quality of a wavelength division multiplexed signal light.

The generation efficiency $\eta_{ijk}$ of the FWM light can be determined by the following equations.

Equation (1):

$$P_{ijk} = \eta_{ijk} \frac{1024\pi^6 \chi_{1111}^2 d^2}{n^4 \lambda^2 c^2} \left( \frac{L_{eff}}{A_{eff}} \right) P_i P_j P_k \exp(-\alpha L)$$

Equation (2):

$$\eta_{ijk} = \frac{\alpha^2}{\alpha^2 + \Delta\beta^2} \left[ 1 + 4\exp(-\alpha L) \frac{\sin^2(\Delta\beta L/2)}{[1 - \exp(-\alpha L)]^2} \right]$$

Equation (3):

$$\Delta\beta = -\frac{\lambda^4 \pi}{c^2} \frac{dD}{d\lambda} [(f_i - f_o) + (f_j - f_o)](f_i - f_k)(f_j - f_k)$$

where $P_{ijk}$: FWM light power
$\Delta\beta$: phase offset amount
$P_i$, $P_j$, $P_k$: input light power
$\lambda$: wavelength
n: refraction index in optical fiber
$\chi_{1111}$: tertiary non-linear susceptibility
c: velocity of light
$\alpha$: loss factor of optical fiber
d: degeneracy coefficient (when i=j≠k, d=3, when i≠j≠k, d=6)
L: optical fiber length
$f_0$: zero dispersion frequency
$L_{eff}$: effective fiber length [=(1-exp(-$\alpha$L))/$\alpha$]
$f_i$, $f_j$, $f_k$: signal light frequency
$A_{eff}$: effective sectional area
D: dispersion value of optical fiber
dD/d$\lambda$: dispersion slope Equation (1), above, indicates that the FWM light power ($P_{ijk}$) relies upon the magnitude of the non-linear effect ($\chi_{1111}$), the input light powers ($P_i$, $P_j$, $P_k$) and the polarization conditions. Equation (2) indicates that the generation efficiency $\eta_{ijk}$ of the FWM light is associated with the phase offset amount ($\Delta\beta$). Equation (3) indicates that the phase offset amount ($\Delta\beta$) relies upon the distances between the signal light frequencies ($f_i$, $f_j$, $f_k$) and the dispersion value (D) of the optical fiber.

Therefore, it can be seen that the generation efficiency $\eta_{ijk}$ of the FWM light depends mainly upon the phase offset amount $\Delta\beta$ which, in turn, relies upon the wavelength distances between the light waves and the dispersion value of the optical fiber. Moreover, a dispersion shift fiber having a zero dispersion region in the proximity of the 1.5 $\mu$m band exhibits a minimum transmission loss in the 1.5 μm band, and is therefore typically employed as a transmission line in an optical communication system. Consequently, the dispersion shift fiber will cause significant, undesireably crosstalk influence of FWM.

To eliminate the influence of crosstalk caused by FWM in a dispersion shift fiber having a zero dispersion region in the proximity of the 1.5 μm, the input power to the optical fiber must be reduced. However, reducing the input power will further deteriorate the transmission quality of signal lights transmitted through the fiber.

For example, in the case of a wavelength division multiplexed signal light in which wavelengths (frequencies) are arranged at equal intervals, a large number of FWM lights appear in a same wavelength. The number of FWM lights exhibits a maximum value between adjacent wavelengths.

Table 1 below indicates the total numbers of FWM lights produced at individual wavelengths for a wavelength division multiplexed signal light having sixteen (16) different wavelengths (16 channels) multiplexed together.

TABLE 1

Total numbers of FWM lights produced in 16 channels of a wavelength division multiplexed signal light

| Channel No. | 1 | 2 | 3 | 4 | 5 | 6 | 7 | 8 |
|---|---|---|---|---|---|---|---|---|
| | 16 | 15 | 14 | 13 | 12 | 11 | 10 | 9 |
| Number of FWM lights | 56 | 63 | 69 | 74 | 78 | 81 | 83 | 84 |

As illustrated in Table 1, the number of FWM lights produced in adjacent channels (such as, for example, adjacent channels 8 and 9) exhibits a maximum value.

The crosstalk amount by FWM lights of a certain wavelength is determined by calculating FWM light powers independently of each other based on all combinations of i, j and k, using Equations (1), (2) and (3), above, and then adding the FWM powers thus obtained.

Therefore, several countermeasures can be taken to reduce the influence of FWM light upon a wavelength division multiplexed signal light. For example, the wavelengths of the wavelength division multiplexed signal light can be arranged so that, even if FWM is produced, the FWM will not significantly affect the wavelengths of the wavelength division multiplexed signal light. In addition, a wavelength region which is spaced a certain distance from a zero dispersion wavelength of the optical fiber can be used for the wavelength division multiplexed signal light. However, setting the wavelengths in such a manner is becoming impractical as higher-capacity and higher-speed communication systems require additional bandwidth from optical amplifiers and also require a larger number of signal lights to be wavelength multiplexed.

Therefore, a method of suppressing generation of FWM light by depolarizing signal lights to be wavelength multiplexed has been proposed. For example, see "J. Lightwave Technol., vol. 11, pp.2116–2122, 1993".

Further, the polarization dependent gain of an optical amplifier or the polarization dependent loss of an optical component can significantly deteriorate the SNR of a wavelength division multiplexed signal light transmitted over a long distance through an optical fiber. Particularly in the case of an EDF optical amplifier which employs an erbium-doped optical fiber, the principal factor of the polarization dependent gain is a PHB (Polarization Hole Burning) effect.

Therefore, the influence of a PHB effect can be moderated to suppress deterioration of the SNR by varying the input polarization condition to an EDF optical amplifier at a higher speed than the speed of response of PHB. Further, since the deterioration in SNR caused by the polarization dependent loss of an optical component can be suppressed if the polarization conditions of signal lights are scrambled at a higher rate than the transmission rate, a polarization scrambler can be used to scramble the polarization conditions by applying an electro-optical effect. Polarization scramblers have also been developed which use a variation of the double refraction factor of an optical fiber caused by a stress to the fiber.

For example, FIG. 28 is a diagram illustrating a conventional polarization scrambling optical transmission system which scrambles the polarization of a wavelength division multiplexed signal light, for experimental purposes. The optical transmission system illustrated in FIG. 28 is for experimental purposes, and the modulation of signal lights would likely be configured differently when used in practical situations. More specifically, as discussed in more detail below, FIG. 28 illustrates an optical transmission system in which individual signal lights are combined into a wavelength division multiplexed signal light, and the wavelength division multiplexed signal light is then modulated with data. However, in an optical transmission system used in a practical situation, the individual signal lights would be individually modulated, and the modulated signal lights would then be combined together into a wavelength division multiplexed signal light.

Referring now to FIG. 28, signal light transmission sections 21-1 to 21-4 represent four separate channels to be multiplexed together into a single wavelength division multiplexed signal light. Each signal light transmission section 21-1 to 21-4 includes a light reception element 211, a laser diode 212 and a polarization control section (PC) 213.

Individual signal lights for four channels from signal light transmission sections 21-1 to 21-4 are combined and wavelength multiplexed together by a wave combiner 22 and then passed through a polarization control section or polarization controller (PC) 23. Polarization controller 23 is formed by an optical fiber arranged in a circular shape. After passing through the polarization controller 23, the signal lights pass through a polarizer 24 which arranges the polarization of each channel to be the same. The signal lights are then modulated by a modulation section 25 using NRZ (Non-Return to Zero) data. The modulated signal lights are then collectively polarization scrambled with the same scrambling frequency by a polarization scrambler 26, so that the influence of non-linear optical effects upon transmission of a wavelength division multiplexed signal light can be suppressed. The polarization scrambled signal lights are then amplified by an amplifier 27.

Unfortunately, the polarization scrambling optical transmission system illustrated in FIG. 28 cannot sufficiently suppress non-linear optical effects, such as FWM light and XPM, and cannot provide an acceptable level of SNR.

SUMMARY OF THE INVENTION

Accordingly, it is an object of the present invention to provide a polarization scrambling optical transmission system which sufficiently suppresses non-linear optical effects, such as FWM light and XPM, and provides an acceptable level of SNR.

It is an additional object of the present invention to provide a polarization scrambling optical transmission system which suppresses non-linear optical effects and increases SNR by effectively scrambling the polarization of signal lights combined into a wavelength division multiplexed signal light.

The foregoing objects of the present invention are achieved by providing a method and apparatus for scrambling a polarization of signal lights. The method and apparatus (a) scramble the polarization of a signal light with a scrambling frequency; and (b) combine the polarization scrambled signal light with at least one other signal light to form a wavelength division multiplexed signal light.

When scrambling the polarization, the method and apparatus can also (i) scramble the polarization of a first signal light with a first scrambling frequency, and (ii) scramble the polarization of a second signal light with a second scrambling frequency which is different from the first scrambling frequency. The method and apparatus would then combine the first and second polarization scrambled signal lights to form the wavelength division multiplexed signal light.

Objects of the present invention are also achieved by providing a method and apparatus which (a) combines first and second signal lights to form a resulting wavelength division multiplexed signal light, the first and second signal lights having different polarization, and (b) scrambles the polarization of the resulting wavelength division multiplexed signal light with a signal scrambling frequency.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
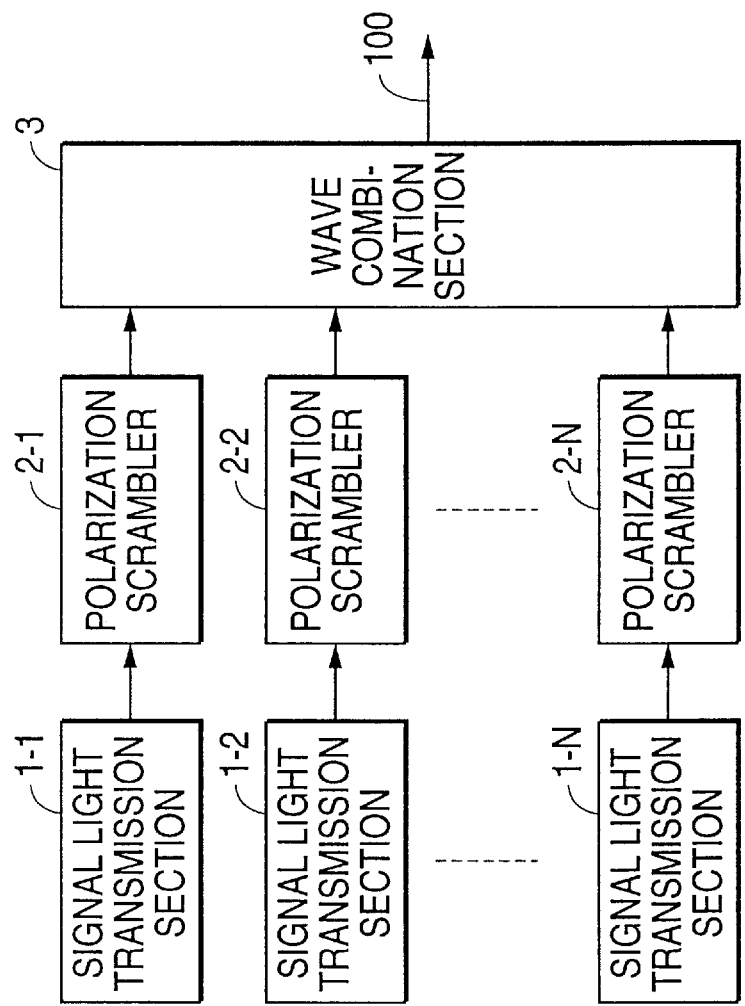
FIG. 1 is a diagram illustrating a polarization scrambling optical transmission system according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating a polarization scrambling optical transmission system according to an embodiment of the present invention. Referring now to FIG. 1, the polarization scrambling optical transmission system includes a plurality of signal light transmission sections 1-1 to 1-N (where N is an integer) and a plurality of polarization scramblers 2-1 to 2-N respectively corresponding to the plurality of signal light transmission sections 1-1 to 1-N. The polarization scrambling optical transmission system also includes a wave combination section 3.

The signal light transmission sections 1-1 to 1-N transmit a plurality of signal lights for a plurality of channels to be wavelength multiplexed. Thus, each signal light has a different frequency, thereby representing a different channel. The polarization scramblers 2-1 to 2-N scramble to polarizations of the signal lights. Polarization scramblers 2-1 to 2-N each have a different scrambling frequency so that the polarization of each signal light is scrambled with a different scrambling frequency. The wave combination section 3 combines, or "wavelength multiplexes", the plurality of polarization scrambled signal lights to form a wavelength division multiplexed signal light 100.

Therefore, polarization scrambling is performed by the polarization scramblers 2-1 to 2-N at a different frequency for each of the signal lights multiplexed together. Consequently, the polarization conditions of signal lights of adjacent channels are varied relative to each other, and wavelength multiple signal light 100 has a polarization condition representing an average of the polarization conditions of the signal lights.

An "aimed" channel is defined as a channel which is the subject of scrambling by a respective polarization scrambler. Moreover, signal lights can be defined as "adjacent". For example, two signal lights are defined as being adjacent when the frequencies of the respective signal lights are adjacent to each other in a frequency spectrum, without the frequency of a different signal light therebetween. In the embodiment of the present invention illustrated in FIG. 1, if a frequency difference between the scrambling frequency of a polarization scrambler for the signal light of an aimed channel and the scrambling frequency of a polarization scrambler for the signal light of an adjacent channel is set larger than a frequency difference between the scrambling frequency of the polarization scrambler for the signal light of the aimed channel and the scrambling frequency of a polarization scrambler for the signal light of a non-adjacent channel, then the difference in polarization conditions of adjacent signal lights can be increased.

In FIG. 1, polarization scrambling is performed for the signal lights from all of the plurality of signal light transmission sections 1-1 to 1-N with different scrambling frequencies from each other by the polarization scramblers 2-1 to 2-N. For example, where N>2, a plurality of polarization scramblers (for example, polarization scramblers 2-2 to 2-N) may be provided. Moreover, when N=2, two signal lights can first be combined into a wavelength division multiplexed signal light, and that wavelength division multiplexed signal light can have the polarization scrambled by a single polarization scrambler. Therefore, polarization scrambling may be performed for a wavelength multiple signal light representing a combination of signal lights, or for a specific signal light or a group of signal light of the plurality of signal light transmission sections 1-1 to 1-N with different scrambling frequencies (when N>2).

In FIG. 1, the polarization scramblers 2-1 to 2-N can each scramble signal lights with a different scrambling frequency, or with the same scrambling frequency. Alternatively, one or more of the polarization scramblers 2-1 to 2-N can scramble the corresponding signal lights with the same frequency $f_1$, and the remaining polarization scramblers can scramble the corresponding signal lights with the same frequency $f_2$ which is different from the frequency $f_1$. Additionally, there can be several different scrambling frequencies, such as $f_1$, $f_2$ and $f_3$, with various polarization scramblers scrambling the corresponding signal lights with either $f_1$, $f_2$ or $f_3$.

Figure 2:
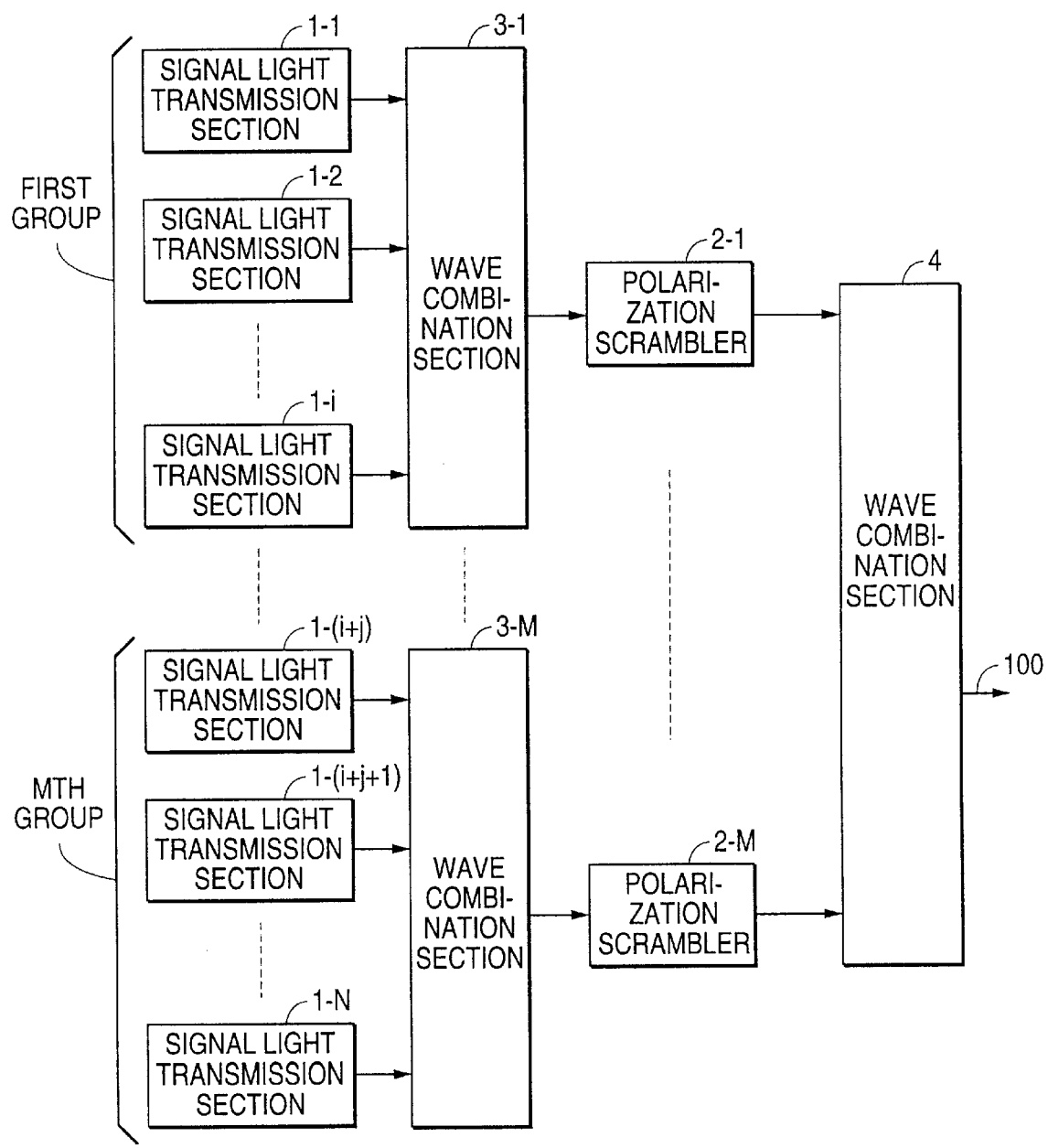
FIG. 2 is a diagram illustrating a polarization scrambling optical transmission system according to an embodiment of the present invention.

FIG. 2 is a diagram illustrating a polarization scrambling optical transmission system according to an additional embodiment of the present invention. Referring now to FIG. 2, the polarization scrambling optical transmission system includes signal light transmission sections 1-1 to 1-N, polarization scramblers 2-1 to 2-M (where M<N), and wave combination sections 3-1 to 3-M and 4. The plurality of signal light transmission sections 1-1 to 1-N are divided into a plurality of (M) groups, and the plurality of polarization scramblers 2-1 to 2-M perform polarization scrambling with scrambling frequencies different from each other.

In particular, polarization scrambling is performed for signal lights from those signal light transmission sections 1-1 to 1-i (where i<N) which form one group (for example, a first group) by the polarization scrambler 2-1 with the same scrambling frequency. However, polarization scrambling is performed for signal lights from the signal light transmission sections 1-(i+j) to 1-N which form a different group or groups (for example, a second to Mth group) by the polarization scramblers 2-2 to 2-M, each with a different scrambling frequency.

In the above embodiments of the present invention, polarization scrambling is performed for wavelength multiplexed signal lights of the plurality of channels (in this instance, however, each of the plurality of groups into which the signal light transmission sections 1-1 to 1-N are divided is regarded as one channel) by the polarization scramblers 2-1 to 2-M, wherein each polarization scrambler 2-1 to 2-M scrambles the polarization with a different scrambling frequency from the other polarization scramblers. Consequently, the polarization conditions of signal lights of adjacent channels are varied relative to each other, and a wavelength multiple signal light 100 can be transmitted in a condition wherein the polarization conditions are averaged among all of the signal lights.

Also, in this instance, if a frequency difference between the scrambling frequency of a polarization scrambler for the signal light of an aimed channel (or aimed group of channels) and a scrambling frequency of a polarization scrambler for signal light of an adjacent channel (or adjacent group of channels) to the aimed channel is set larger than a frequency difference between the scrambling frequency of the polarization scrambler for the signal light of the aimed channel and the scrambling frequency of a polarization scrambler for signal light of a non-adjacent channel which is not adjacent to the aimed channel, then the difference in polarization conditions of signal lights of adjacent channels can be increased.

Further, as illustrated in FIG. 2, when the number of groups is greater than two, polarization scrambling is performed for each group with a different scrambling frequency by the polarization scramblers 2-1 to 2-M. However, where the number of groups is equal to two, the combined signal from each group can be further combined into a single combined signal, and this single combined signal can then be scrambled by a signal polarization scrambler.

Each of the plurality of polarization scramblers 2-1 to 2-M may be provided with redundancy, so that one polarization scrambler is currently being used (or "on-line") while a redundant polarization scrambler held in reserve in case problems occur in the polarization scrambler being used.

Figure 3:
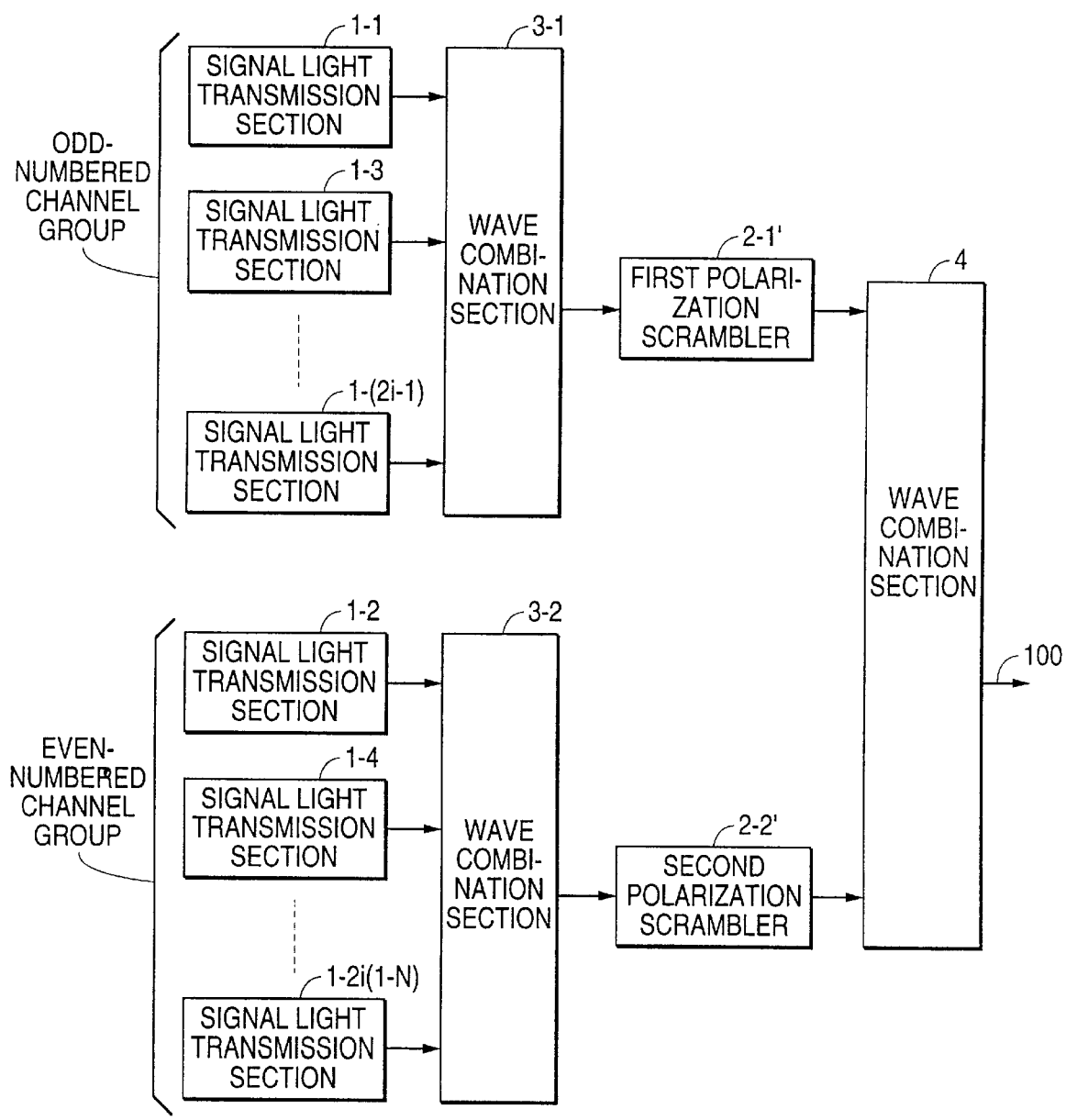
FIG. 3 is a diagram illustrating a polarization scrambling optical transmission system according to an embodiment of the present invention.

FIG. 3 is a diagram illustrating a polarization scrambling optical transmission system according to an embodiment of the present invention. Referring now to FIG. 3, the plurality of signal light transmission sections 1-1 to 1-N are divided into a group (signal light transmission sections 1-1, 1-3, . . . , 1-(2i–1): where 2i=N) of those signal lights of odd-numbered channels and another group (signal light transmission sections 1-2, 1-4, . . . , 1-2i) of those signal lights of even-numbered channels. The signal lights from the odd-numbered channels are combined into a wavelength division multiplexed signal by a wave combination section 3-1. Similarly, signal lights from the even-numbered channels are combined into a wavelength division multiplexed signal by a wave combination section 3-2.

Here, the signal lights or channels can be defined as a first through an Nth signal light or channel as numbered in order along a frequency spectrum of the different frequencies. Thus, the first, third, and fifth signal lights or channels would represent "odd" signal lights or channels. Similarly, the second, fourth and sixth signal lights or channels would represent "even" signal lights or channels.

A first polarization scrambler 2-1' receives the wavelength division multiplexed signal from the wave combination section 3-1 representing a combination of the signals from the odd-numbered channels. Similarly, a second polarization scrambler 2-2' receives the wavelength division multiplexed signal from the wave combination section 3-2 representing a combination of the signals from the even-numbered channels. Thus, the first polarization scrambler 2-1' performs polarization scrambling for those signal lights from those signal light transmission sections 1-1, 1-3, . . . , 1-(2i–1) which form the group of the signal lights of the odd-numbered channels. Similarly, the second polarization scrambler performs polarization scrambling for those signal lights from those signal light transmission sections 1-2, 1-4, . . . , 1-2i which form the group of the signal lights of the even-numbered channels. The first polarization scrambler 2-1' performs polarization scrambling with a first scrambling frequency, and the second polarization scrambler 2-2' performs polarization scrambling with a second scrambling frequency which is different from the first scrambling frequency.

A wave combination section 4 receives the polarization scrambled wavelength division multiplexed signal light from the first polarization scrambler 2-1', and receives the polarization scrambled wavelength division multiplexed signal light from the second polarization scrambler 2-2'. The wave combination section 4 combines the received signal lights and produces a resulting wavelength division multiplexed signal light 100. Consequently, wavelength division multiplexed signal light 100 can be transmitted in a condition wherein the difference in polarization conditions of signal lights of adjacent channels is increased.

Also in this instance, if a frequency difference between the scrambling frequency for a signal light of an aimed channel (in this instance, however, the group of the odd-numbered channels or the group of the even-numbered channels) and a scrambling frequency for a signal light of an adjacent channel (the group of the even-numbered channels or the group of the odd-numbered channels) adjacent the signal light of the aimed channel is set larger than a frequency difference between the scrambling frequency for the signal light of the aimed channel and the scrambling frequency for a signal light of a non-adjacent channel which is not adjacent the signal light of the aimed channel, then the difference of polarization conditions of signal lights of adjacent channels can be increased.

Each of the first polarization scrambler 2-1' and the second polarization scrambler 2-2' may be provided with a redundant polarization scrambler.

In the embodiment of the present invention illustrated in FIG. 3, signal lights can be provided by the odd-numbered signal light transmission sections 1-1 to 1-(2i-1) to all have the same polarization P1. Similarly, signal lights can be provided by the even-numbered signal light transmission sections 1-2 to 1-2i(1-N) to all have the same polarization P2, where P1 is different from P2. Preferably, P1 is orthogonal to P2.

Figure 4:
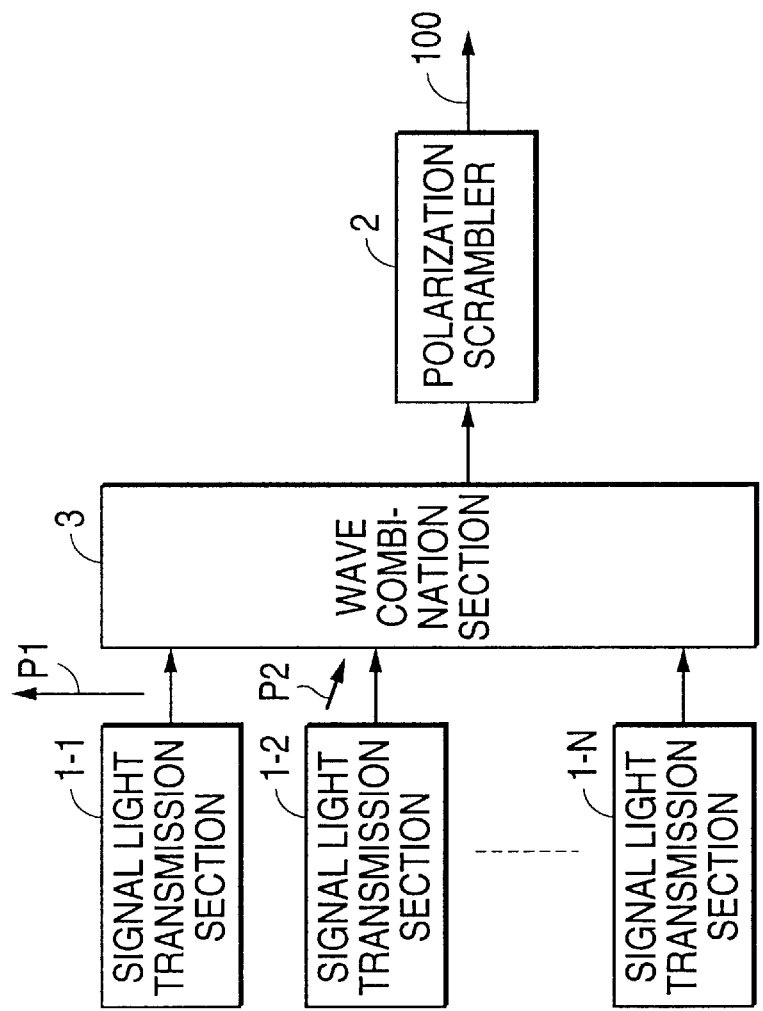
FIG. 4 is a diagram illustrating a polarization scrambling optical transmission system according to an embodiment of the present invention.

FIG. 4 is a diagram illustrating a polarization scrambling optical transmission system according to an embodiment of the present invention. Referring now to FIG. 4, the polarization scrambling optical transmission system includes signal light transmission sections 1-1 to 1-N, a polarization scrambler 2, and a wave combination section 3. Thus, wave combination section 3 combines the signal lights from transmission sections 1-1 to 1-N into a wavelength division multiplexed signal light. The wavelength division signal light is then scrambled by the polarization scrambler 2 with a single scrambling frequency.

In the embodiment of the present invention illustrated in FIG. 4, the plurality of signal light transmission sections 1-1 to 1-N are constructed such that certain ones (for example, the signal light transmission sections 1-1 to 1-i: where 2i=N) of them and the remaining ones (for example, the signal light transmission sections 1-(i+1) to 1-N) of them have different polarization directions, and polarization scrambling is performed for signal lights from the plurality of signal light transmission sections 1-1 to 1-N with a same frequency by the polarization scrambler 2.

Therefore, each of the signal lights produced by signal light transmission sections 1-1 to 1-N has a different polarization before being combined by the wave combination section 3. Alternatively, the various signal lights can have either a first polarization or a second polarization, where the first polarization is orthogonal to the second polarization. Preferably, the signal lights are provided with first and second polarizations so that adjacent signal lights have orthogonal polarizations.

For example, in FIG. 4, assume that signal light transmission section 1-1 produces a signal light which is adjacent to the signal light produced by signal light transmission section 1-2. Moreover, as described above, it is preferable for adjacent signal lights to have polarizations which are perpendicular. Thus, FIG. 4 illustrates a polarization P1 for a signal light produced by signal light transmission section 1-1, and a polarization P2 for a signal light produced by signal light transmission section 1-2. Polarization P1 is orthogonal to polarization P2.

Figure 28:
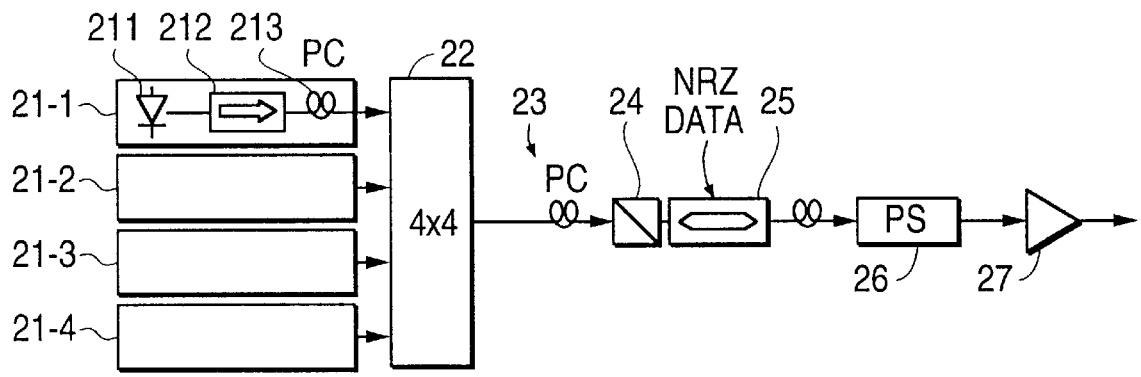
FIG. 28 (prior art) is a diagram illustrating a conventional polarization scrambling optical transmission system, for experimental purposes.
Figures 27A, 27B:
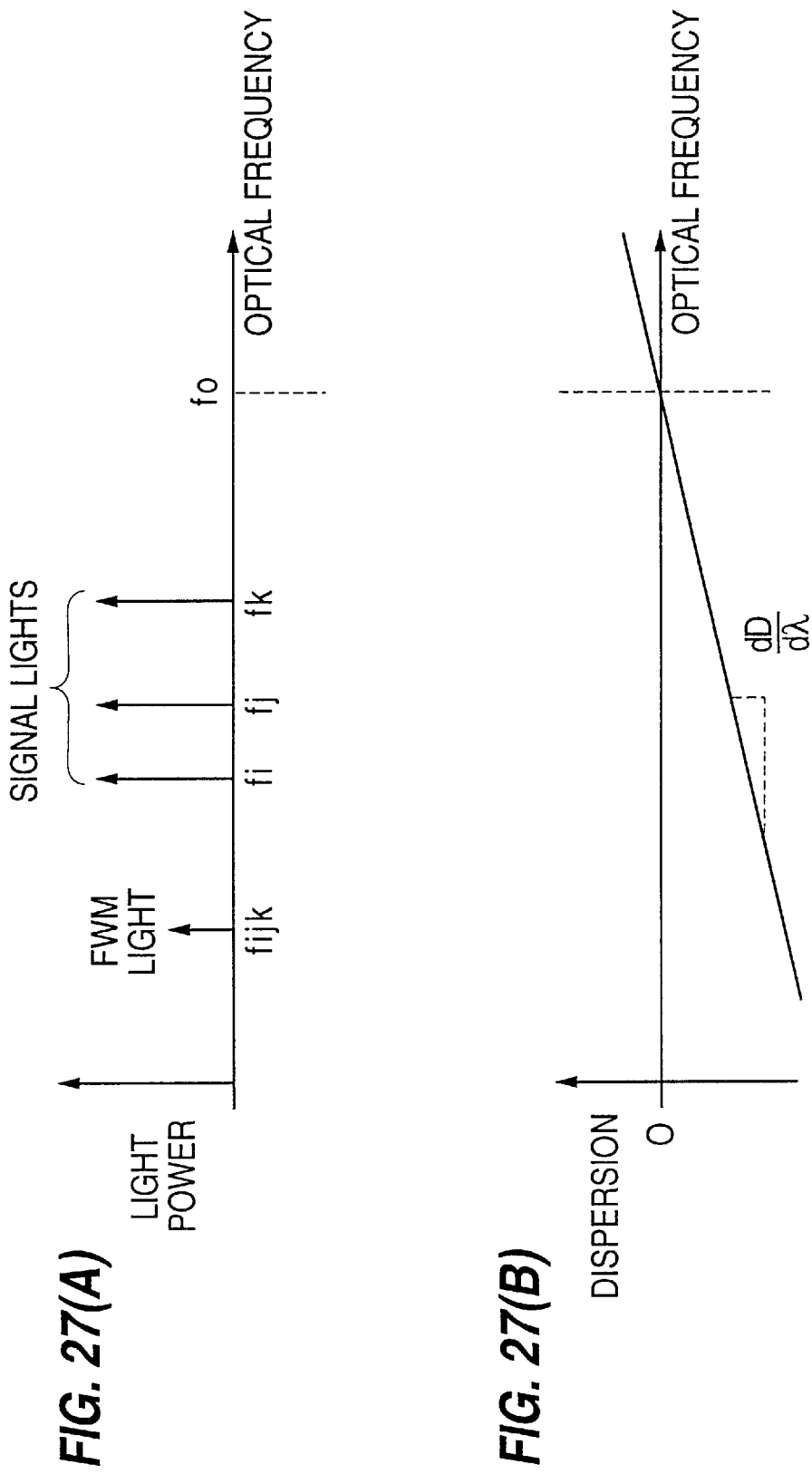
FIGS. 27(A) and 27(B) are diagrams illustrating four wave mixing wave.

The polarization of signal lights in the above embodiments of the present invention can be contrasted to the polarization of signal lights in a conventional polarization scrambling optical transmission system illustrated in FIG. 28. More specifically, in the above embodiments of the present invention, the various signal lights includes different polarizations before the signal lights are combined and then polarization scrambled. By contrast, in FIG. 28, all of the signal lights have the same polarization before being polarization scrambled.

According to the above embodiments of the present invention as illustrated in FIG. 4, a polarization scrambler performs polarization scrambling of a wavelength division multiplexed signal light with a single scrambling frequency. Moreover, the wavelength division multiplexed signal light includes signal lights having different polarization conditions. Therefore, the difference in polarization conditions of adjacent signals in the wavelength division multiplexed signal light can be controlled to be a required amount.

Figure 5:
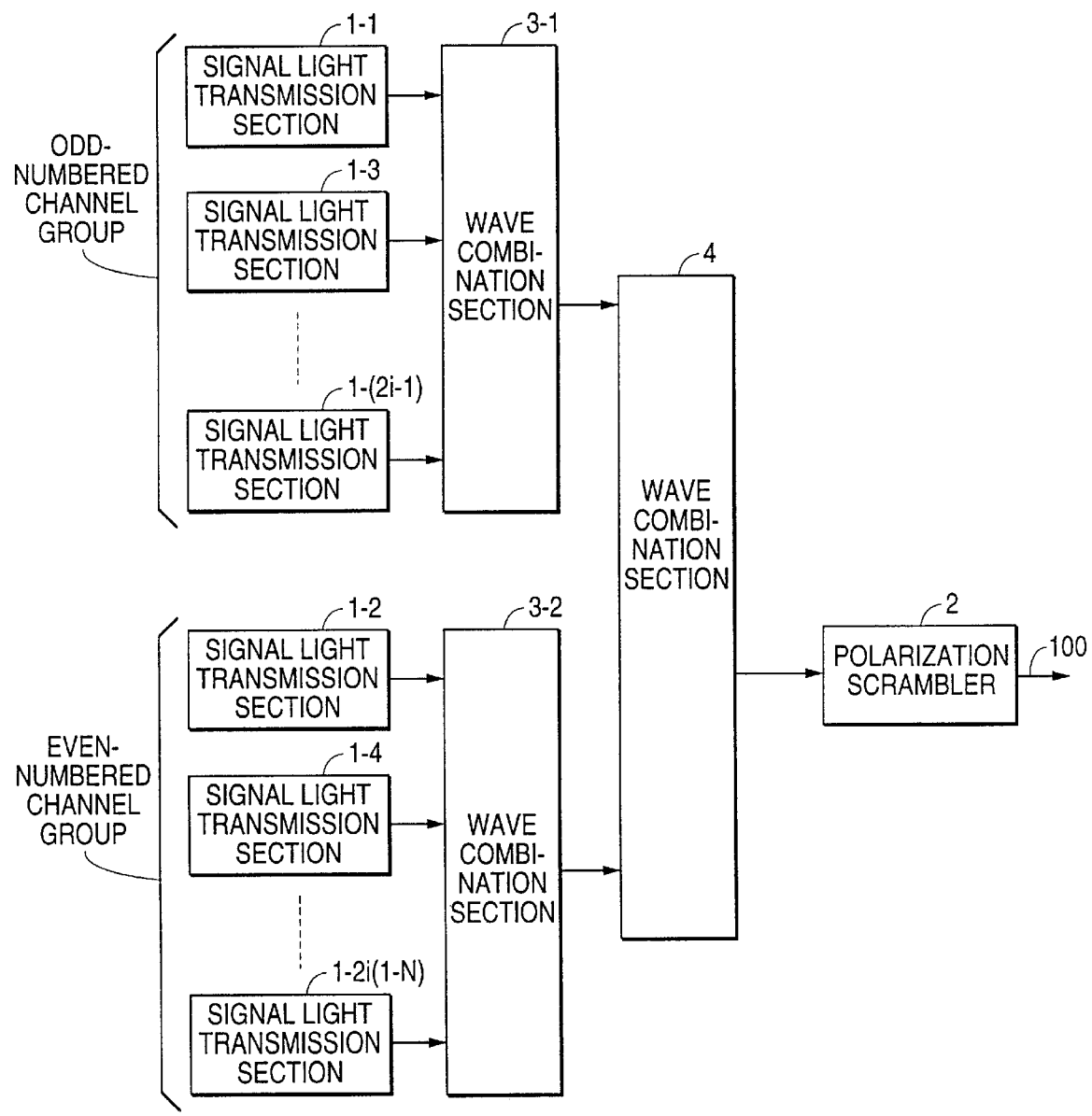
FIG. 5 is a diagram illustrating a polarization scrambling optical transmission system according to an embodiment of the present invention.

FIG. 5 is a diagram illustrating a polarization scrambling optical transmission system according to an embodiment of the present invention. Referring now to FIG. 5, signal light transmission sections 1-1, 1-3, . . . , 1-(2i−1) are odd-numbered signal light transmission sections, or channels, for producing odd-numbered signal lights. The remaining signal light transmission sections 1-2, 1-4, . . . , 1-2i are even-numbered signal light transmission sections, or channels, for producing even-numbered signal lights.

The odd-numbered signal lights are combined into a wavelength division multiplexed signal light by wave combination section 3-1. Similarly, the even-numbered signal lights are combined into a wavelength division multiplexed signal light by wave combination section 3-2. The wavelength division multiplexed signal lights of wave combination sections 3-1 and 3-2 are received by wave combination section 4 and combined into a resulting wavelength division multiplexed signal light 100. The polarization of the resulting wavelength division multiplexed signal light 100 is scrambled with a signal scrambling frequency by the polarization scrambler 2. The polarization conditions of adjacent signal lights produced by the signal light transmission sections can be set to a different condition from each other, or the polarization of each signal light can be set to be different from each of the other signal lights.

Particularly, the polarization of adjacent signal lights can be arranged to be orthogonal to each other. Therefore, polarization scrambling is performed with orthogonal polarization directions to each other between certain ones 1-1 to 1-i of the plurality of signal light transmission sections 1-1 to 1-N and the remaining signal light transmission sections 1-(i+1) to 1-N.

Further, a redundant polarization scrambler may be provided for the polarization scrambler 2, so that the redundant polarization scrambler is operable when the polarization scrambler 2 fails.

Figure 6:
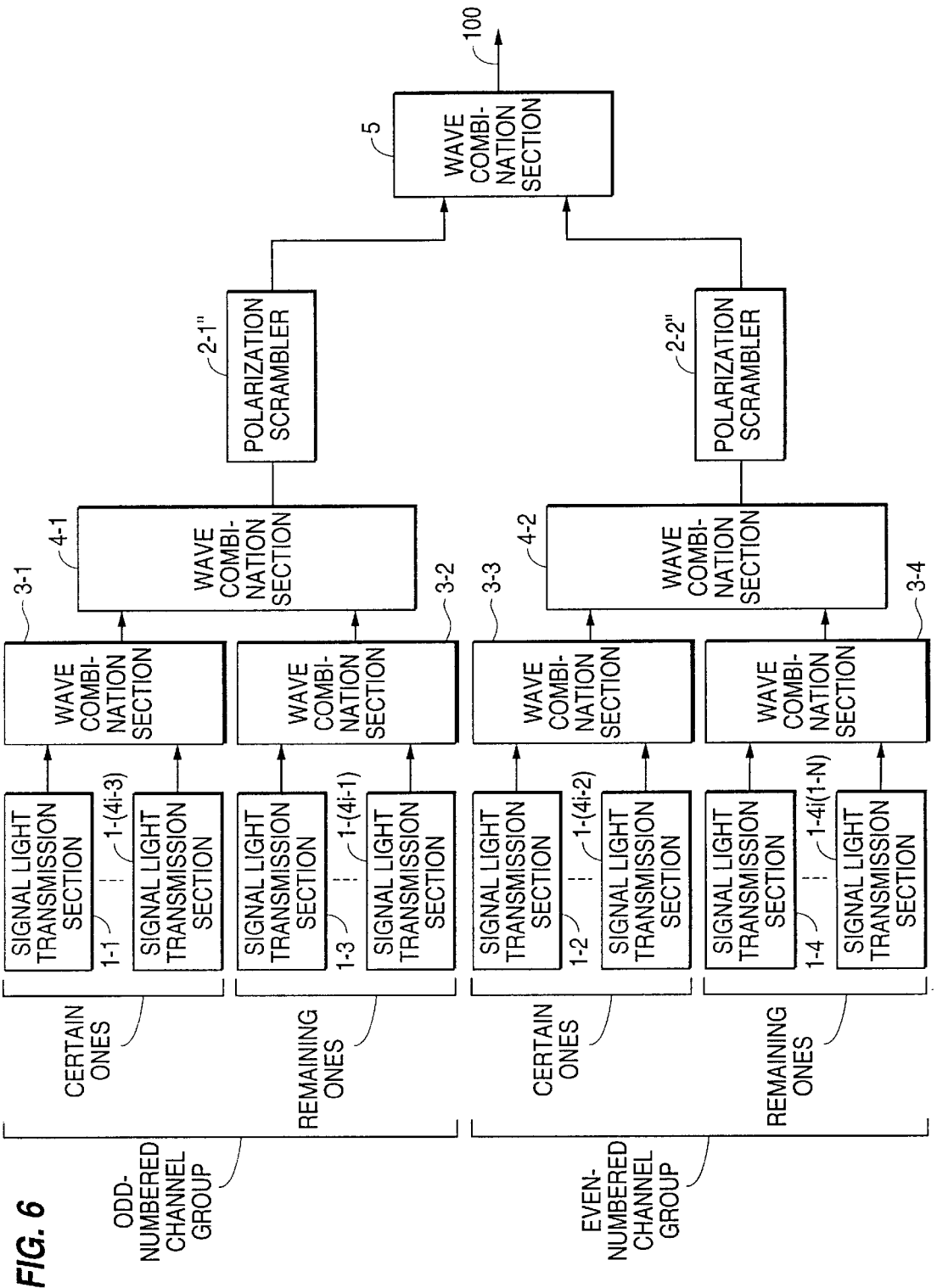
FIG. 6 is a diagram illustrating a polarization scrambling optical transmission system according to an embodiment of the present invention.

FIG. 6 is a diagram illustrating a polarization scrambling optical transmission system according to an embodiment of the present invention. Referring now to FIG. 6, the polarization scrambling optical transmission system includes signal light transmission sections 1-1 to 1-N for a plurality of channels, or signal lights, to be wavelength multiplexed. The polarization scrambling optical transmission system also includes polarization scramblers 2-1" and 2-2", and wave combination sections 3-1 to 3-4, 4-1 and 4-2 and 5.

The plurality of signal light transmission sections 1-1 to 1-N are divided into an odd-numbered group (including signal light transmission sections 1-1, 1-3, . . . , 1-(4i−1), where 4i=N) which provide odd-numbered signal lights, and an even-numbered group (including signal transmission sections 1-2, 1-4, . . . , 1-4i) which provide even-numbered signal lights. Moreover, the odd-numbered signal light transmission sections are further divided into a group of certain ones 1-1, 1-5, . . . , 1-(4i−3) having the same polarization, and a group of remaining ones 1-3, 1-7, . . . , 1-(4i−1) having the same polarization, but which is different from the polarization of the group of certain ones. Signal lights from the group of certain ones of the odd-numbered signal light transmission sections are combined into a wavelength division multiplexed signal light by the wave combination section 3-1. Similarly, signal lights from the group of remaining ones are combined into a wavelength division multiplexed signal light by the wave combination section 3-2. The wavelength division multiplexed signal lights of the wave combinations sections 3-1 and 3-2 are combined into a wavelength division multiplexed signal light by the wave combination section 4-1.

Moreover, the even-numbered signal light transmission sections are divided into a first group of certain ones 1-2, 1-6, . . . , 1-(4i−2) having the same polarization, and a second group of remaining ones 1-4, 1-8, . . . , 1-4i having the same polarization, but which is different from the polarization of the first group of the even-numbered signal light transmission sections. Signal lights from the group of certain ones of the even-numbered signal light transmission sections are combined into a wavelength division multiplexed signal light by the wave combination section 3-3. Similarly, signal lights from the group of remaining ones of the even-nnumbered signal light transmission sections are combined by the wave combination section 3-4 into a wavelength division multiplexed signal light. The wavelength division multiplexed signal lights of wave combinations sections 3-3 and 3-4 are combined into a wavelength division multiplexed signal light by wave combination section 4-2.

The polarization of the wavelength division multiplexed signal light of the wave combination section 4-1 is scrambled by the polarization scrambler 2-1" with a first scrambling frequency. Similarly, the polarization of the wavelength division multiplexed signal light of the wave combination section 4-2 is scrambled by the polarization scrambler 2-2" with a second scrambling frequency which is different from the first scrambling frequency.

In addition, signal lights of a pair of channels the odd-numbered channel group preferably have different polarization directions, so that these signals are eventually multiplexed together and scrambled with the same scrambling frequency by the polarization scrambler 2-1". Similarly, signal lights of a pair of channels the even-numbered channel group preferably have different polarization directions, so that these signals are eventually multiplexed together and scrambled with the same scrambling frequency by the polarization scrambler 2-2".

More specifically, the signal lights from the signal light transmission sections 1-1 to 1-N are preferably polarized so that the polarization conditions of the group of certain ones of the odd-numbered channel group are different from the polarization conditions of the group of remaining ones of the odd-numbered channel group. Similarly, the signal lights from the signal light transmission sections 1-1 to 1-N are preferably polarized so that the polarization conditions of the group of certain ones of the even-numbered channel group are different from the polarization conditions of the group of remaining ones of the even-numbered channel group.

Polarization scramblers 2-1" and 2-2" can each be provided with a redundant polarization scrambler.

In the embodiment of the present invention as illustrated above, signal lights having different polarization conditions preferably have polarization directions which are orthogonal to each other. More specifically, polarization scrambling is performed with polarization directions orthogonal to each other between the certain ones 1-1, 1-5, . . . , 1-(4i−3) and the remaining ones 1-3, 1-7, . . . , 1-(4i−1) of the odd-numbered channels. Similarly, polarization scrambling is performed with polarization directions orthogonal to each other between the certain ones 1-2, 1-6, . . . , 1-(4i−2) and the remaining ones 1-4, 1-8, . . . , 1-4i of the even-numbered channels.

Each of the polarization scrambling optical transmission system shown in FIGS. 1 to 6 can be provided with redundant signal light transmission sections for one or all of the signal light transmission sections 1-1 to 1-N.

Figure 7:
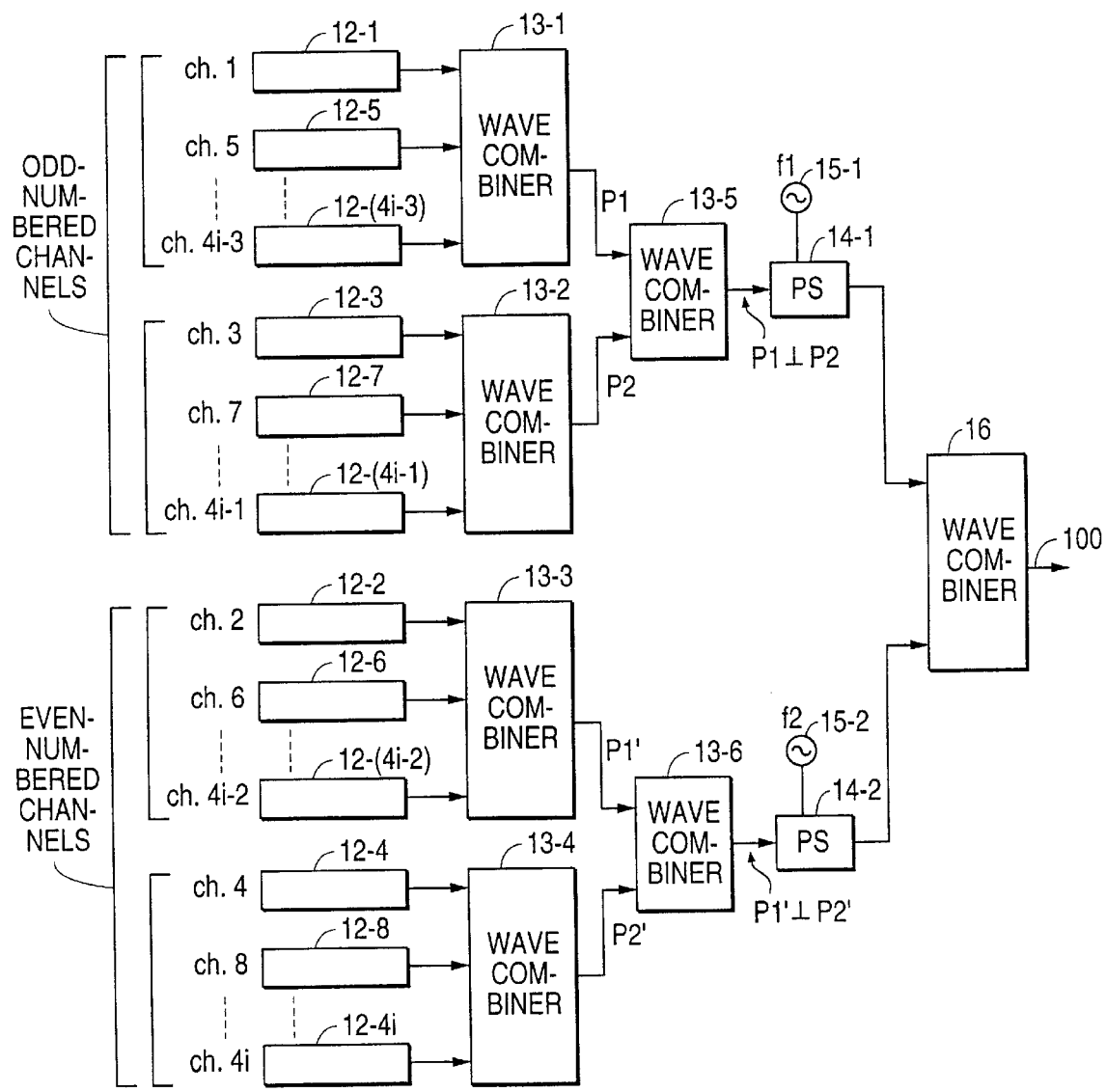
FIG. 7 is a diagram illustrating a polarization scrambling optical transmission system according to an embodiment of the present invention.

FIG. 7 is a diagram illustrating a polarization scrambling optical transmission system according to an embodiment of the present invention. Referring to FIG. 7, the polarization scrambling optical transmission system shown includes signal light transmission sections 12-1 to 12-4i (i is an integer), wave combiners 13-1 to 13-6 and 16, polarization scramblers (PS) 14-1 and 14-2, and oscillators 15-1 and 15-2. Oscillator 15-1 provides polarization scrambling at a frequency $f_1$, and oscillator 15-2 provides polarization scrambling at a frequency $f_2$. Frequency $f_1$ is different from $f_2$.

Moreover, as illustrated in FIG. 7, the odd-numbered channels (signal light transmission sections 12-1, 12-3, . . . , 12-4 (i−1)) are divided into a first group and a second group. Signal lights from the first group all have the same polarization P1 and are combined by the wave combiner 13-1 into a wavelength division multiplexed signal light having a polarization P1. Thus, the wave combiner 13-1 is a polarization maintaining wave combiner. Signal lights from the second group all have the same polarization P2 and are combined by the wave combiner 13-2 into a wavelength division multiplexed signal light having a polarization P2. Thus, the wave combiner 13-2 is a polarization maintaining wave combiner. Polarization P1 is orthogonal to polarization P2. The wavelength division multiplexed signal lights of wave combiners 13-1 and 13-2 are combined by the wave combiner 13-5 into a wavelength division multiplexed signal light which maintains the polarization conditions of P1 being orthogonal to P2. Thus, wave combiner 13-5 is a polarization maintaining wave combiner. The wavelength division multiplexed signal light output from wave combiner 13-5 is scrambled by polarization scrambler 14-1 at the frequency $f_1$.

Similarly, as illustrated in FIG. 7, the even-numbered channels (signal light transmission sections 12-2, 12-4, . . . , 12-4i) are divided into a first group and a second group. Signal lights from the first group all have the same polarization P1' and are combined by the wave combiner 13-2 into a wavelength division multiplexed signal light which maintains the polarization P1'. Thus, the wave combiner 13-3 is a polarization maintaining wave combiner. Signal lights from the second group all have the same polarization P2' and are combined by the wave combiner 13-4 into a wavelength division multiplexed signal which maintains the polarization P2'. Thus, the wave combiner 13-4 is a polarization maintaining wave combiner. Polarization P1' is orthogonal to polarization P2'. The wavelength division multiplexed signal lights of wave combiners 13-3 and 13-4 are combined by wave combiner 13-6 into a wavelength division multiplexed signal light which maintains the polarization of P1' being orthogonal to P2'. Thus, the wave combiner 13-6 is a polarization maintaining wave combiner. The wavelength division multiplexed signal light output from wave combiner 13-6 is scrambled by polarization scrambler 14-2 at the frequency $f_2$. The polarization scrambled, wavelength division multiplexed signal lights are then combined into a resulting wavelength division multiplexed signal light 100 by wave combiner 16. Wave combiner 16 is also a polarization maintaining wave combiner.

Therefore, signal lights from the signal light transmission sections 12-1, 12-3, . . . , 12-(4i−1) of the odd-numbered channel group are eventually provided to polarization scrambler 14-1 in a condition wherein the polarization condition P1 of the (4i−3)th (1st, 5th, 9th, . . . ) signal lights as counted from the short wavelength side (or the long wavelength side) and the polarization condition P2 of the (4i−1)th (3rd, 7th, 11th, . . . ) signal lights are orthogonal to each other (P1⊥P2).

Similarly, signal lights from the signal light transmission sections 12-2, 12-4, . . . , 12-4i of the even-numbered channel group are eventually provided to the polarization scrambler 14-2 in a condition wherein the polarization condition P1' of the signal lights from the certain signal light transmission sections 12-2, 12-4, . . . , 12-(4i−2) and the polarization condition P2' of the signal lights from the remaining signal light transmission sections 12-4, 12-8, . . . , 12-4i remain orthogonal to each other. In other words, signal lights from the signal light transmission sections 12-2, 12-4, . . . , 12-4i of the even-numbered channel group are provided to the polarization scrambler 14-2 in a condition wherein the polarization condition P1' of the (4i−2)th (2nd, 6th, 10th, . . . ) signal lights as counted from the short wavelength side (or the long wavelength side) and the polarization condition P2' of the 4ith (4th, 8th, 12th, . . . ) signal lights are orthogonal to each other (P1'⊥P2').

Consequently, in the polarization scrambler 14-1, polarization scrambling is performed with orthogonal polarization directions to each other for, from among the wavelength multiplexed signal lights from the odd-numbered channel group, those signal lights from the certain signal light transmission sections 12-1, 12-5, . . . , 12-(4i−3) and those signal lights from the remaining signal light transmission sections 12-3, 12-7, . . . , 12-(4i−1). Moreover, polarization scrambling by polarization scrambler 14-1 is performed in response to a signal (frequency $f_1$) from the oscillator 15-1.

Similarly, in the polarization scrambler 14-2, polarization scrambling is performed with orthogonal polarization directions to each other for, from among the wavelength multiplexed signal lights from the even-numbered channel group, those signal lights from the signal light transmission sections 12-2, 12-6, . . . , 12-(4i−2) and those signal lights from the remaining signal light transmission sections 12-4, 12-8, . . . , 12-4i. Polarization scrambling by polarization scrambler 14-2 is performed in response to a signal (frequency $f_2$) from the oscillator 15-2.

Therefore, polarization scrambling is performed by the polarization scrambler 14-1 at a frequency $f_1$ for signal lights in the odd-numbered channel group. Simultaneous with the scrambling of the signals in the odd-numbered channel group, polarization scrambling is performed by polarization scrambler 14-2 at a frequency $f_2$, which is different from the frequency $f_1$, for signal lights in the even-numbered channel group.

As a result, wavelength multiplexed signal lights from the signal light transmission sections 12-1 to 12-4i (signal lights for the individual channels ch.1 to ch.4i) are polarization scrambled and transmitted in a condition wherein, for example, the polarization directions and the frequencies of the signal lights are individually different from the polarization directions and the frequencies of the signal lights of individual adjacent channels.

Figure 8:
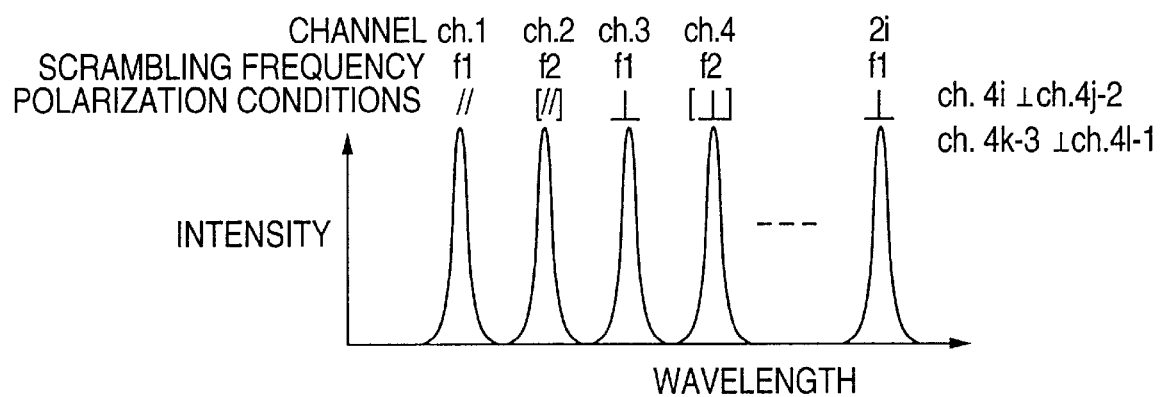
FIG. 8 is a graph illustrating the spectra of signal lights and a channel arrangement of the polarization scrambling optical transmission system illustrated in FIG. 7, according to an embodiment of the present invention.

FIG. 8 is a graph illustrating such a spectra of signal lights and a channel arrangement of the polarization scrambling optical transmission system illustrated in FIG. 7, according to an embodiment of the present invention. More specifically, referring now to FIG. 8, the polarization directions and the frequencies of signal lights are individually different from the polarization directions and the frequencies of the signal lights of individual adjacent channels.

Accordingly, the influences of non-linear optical effects (such as FWM and XPM) by the signal light of the channel ch.4i and the signal light of the channel ch.4i–2 and by the signal light of the channel 4i–3 and the signal light of the channel ch.4i–1 upon transmission of a wavelength division multiplexed signal light are minimized. Moreover, the relationship in polarization condition of the two signal light pairs from the odd-numbered channel group and the even-numbered channel group varies in the period of "$f_2 - f_1$". As a result, the influences of non-linear optical effects are averaged and suppressed to intermediate conditions between those when the polarization conditions of the two signal light pairs are orthogonal to each other and those when the polarization conditions are in parallel to each other.

For example, where $f_1 = 5$ GHz and $f_2 = 6$ GHz, the relationship in polarization condition varies in the period of 6 GHz–5 GHz=1 GHz. Since this corresponds, when converted into the distance, to a variation in polarization condition in the period of 0.3 m, sufficient averaging can be achieved even upon transmission of a wavelength multiple signal over up to several thousands km.

In this manner, with a polarization scrambling optical transmission system according to the above embodiments of the present embodiment, polarization scrambling is performed so that the polarization conditions of signal lights of adjacent channels are be orthogonal to (or different from) each other. As a result, non-linear optical effects (such as FWM), which are produced upon transmission of a wavelength division multiplexed signal light, can be minimized to stabilize and significantly improve the transmission quality (SNR) of the wavelength division multiplexed signal light. Thus, the above embodiments of the present invention will allow an increase in density in wavelength multiplexing (that is, effective utilization of a transmission band) and will allow a longer length transmission line to be used.

Moreover, the embodiment of the present invention as illustrated in FIG. 7 will allow a large number of signal light transmission section to be used, while only using two polarization scramblers 14-1 and 14-2 to be provided. Moreover, each polarization scrambler 14-1 and 14-2 can be provided with a redundant polarization scrambler to ensure reliability of the overall communication system.

In the embodiment of the present invention illustrated in FIG. 7, the polarization directions P1 and P2 and the polarization directions P1' and P2' need not necessarily be orthogonal to each other, but may be different from each other by a required amount.

Figure 9:
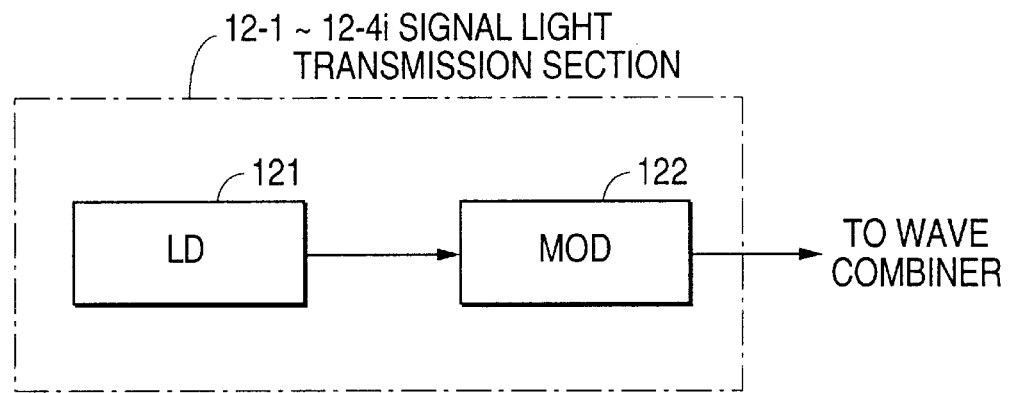
FIG. 9 is a diagram illustrating a signal light transmission section of a polarization scrambling optical transmission system, according to an embodiment of the present invention.

FIG. 9 is a diagram illustrating a signal light transmission section of the polarization scrambling optical transmission system illustrated in FIG. 7, according to an embodiment of the present invention. Referring now to FIG. 9, each signal light transmission sections 12-1 to 12-4i includes a laser diode (LD) 121 for generating a signal light of a desired wavelength corresponding to one of the channels ch.1 to ch.4i, and a modulation section (MOD) 122 for performing required modulation processing, such as intensity modulation, for the signal light from the laser diode 121.

Referring again to FIG. 7, to allow signal lights from the signal light transmission sections 12-1 to 12-4i to maintain the same linear polarization conditions while propagating and being combined with other signal lights, a polarization maintaining fiber or a fixed polarization wave combiner is employed for the wave combiners 13-1 to 13-6 and 16. In a fixed polarization wave combiner, a fusion type polarization coupler is formed by connecting polarization maintaining fibers to each other by fusion. A fixed polarization wave combiner of the bulk type referred to as "PBS" is widely used to combine signal lights while maintaining polarization of the signal lights.

Figure 10:
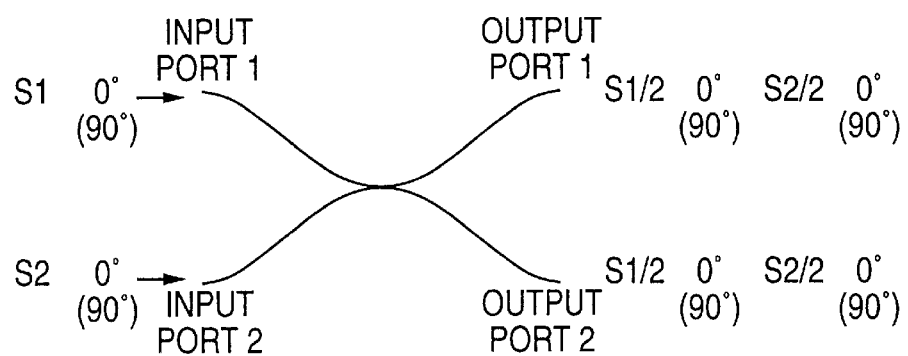
FIG. 10 is a diagram illustrating characteristics of a 1:1 branching fixed polarization coupler, according to an embodiment of the present invention.

FIG. 10 is a diagram illustrating characteristics of a 1:1 branching fixed polarization coupler which is a fusion type polarization coupler, according to an embodiment of the present invention. Referring now to FIG. 10, with the 1:1 branching fixed polarization coupler, when a linearly polarized light is input in register with an axis of an input port 1 (in a direction of 0 degree), the polarization condition of the linearly polarized light is maintained and the linearly polarized light of 0 degree is output to an output port 1 and another output port 2. When the linearly polarized light is input in a condition rotated by 90 degrees with respect to the axis of the input port 1, the linearly polarized light of 90 degrees is output to the output port 1 and the output port 2.

Similarly, when a linearly polarized light is input in the direction of 0 degrees with respect to the axis of the input port 2, a linearly polarized light of 0 degrees is output to the output port 1 and the output port 2. When a linearly polarized light is input in the direction of 90 degrees with respect to the axis of the input port 2, a linearly polarized light of 90 degrees is output to the output port 1 and the output port 2.

Here, for example, if a linearly polarized light S1 is input to the input port 1 and another linearly polarized light S2 is input to the input port 2, the orthogonal relationship between the linearly polarized lights S1 and S2 can be selected as shown in Table 2, below, by selecting the directions of polarized lights to be input to 0 degree or 90 degrees. The wave combiners 13-1 to 13-6 and 16 illustrated in FIG. 7 are each realized by a combination of minimum units for which such a 1:1 branching fusion type polarization coupler is used.

TABLE 2

| Input Light Polarization Directions and Output Conditions | | |
|---|---|---|
| Direction of Input of S1 | Direction of Input of S2 | Direction of Output of S3 |
| 0 degree | 0 degree | S1 // S2 |
| 0 degree | 90 degrees | S1 ⊥ S2 |
| 90 degrees | 0 degree | S1 ⊥ S2 |
| 90 degrees | 90 degrees | S1 // S2 |

The influence of non-linear optical effects upon transmission of wavelength division multiplexed signal lights exhibits, where two signal lights (signal lights for two channels) are considered, a lowest value when the polarization conditions of the signal lights for the two channels are orthogonal to each other. The influence of non-linear optical effects exhibits a highest value when the polarization conditions are parallel to each other. Accordingly, if polarization scrambling is performed so that the polarization conditions of two signal lights are always orthogonal to each other, then it is possible to moderate the influence of non-linear optical effects.

As previously described, polarization scramblers 14-1 and 14-2 illustrated in FIG. 7 must perform polarization scrambling so that the polarization conditions of two signal lights always be orthogonal to each other.

Figure 11:
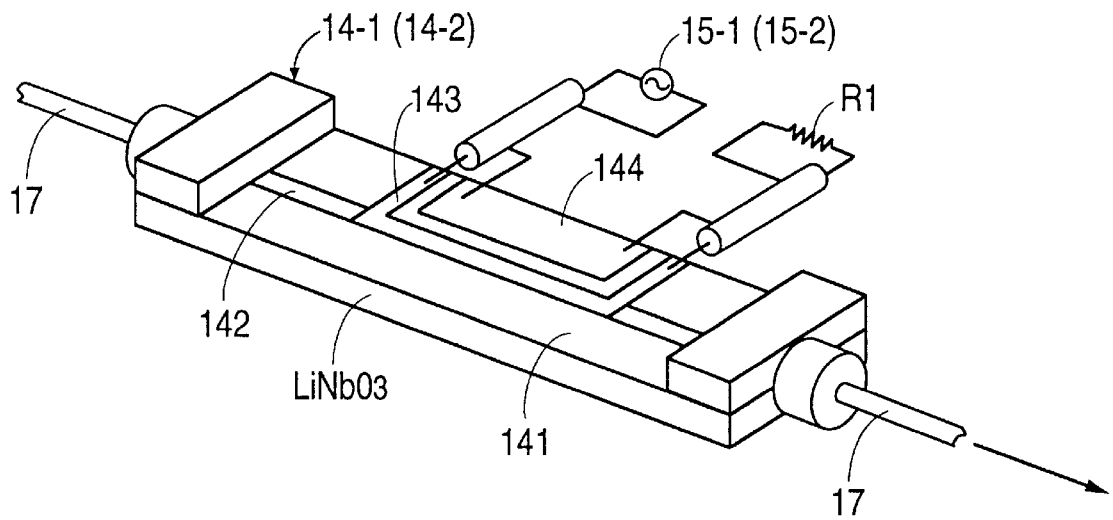
FIG. 11 is a diagram illustrating a perspective view of a polarization scrambler, according to an embodiment of the present invention.

FIG. 11 is a diagram illustrating a perspective view of such a polarization scrambler, according to an embodiment of the present invention. More specifically, FIG. 11 illustrates a phase modulator type polarization scrambler for use as polarization scramblers 14-1 and 14-2 illustrated in FIG. 7.

Referring now to FIG. 9, each polarization scrambler 14-1 and 14-2 includes a waveguide 141 formed from an oxide of lithium niobate (LiNb) on which a titanium (Ti) coating is formed, a LiNbO3 waveguide 142, and a pair of electrodes 143 and 144 for transmitting a signal from the oscillator 15-1 (or 15-2) along the LiNbO3 waveguide 142. A terminating resistor R1 is provided for the electrodes 143 and 144.

In each of the polarization scramblers 14-1 and 14-2 of the phase modulator type, the polarization condition of signal lights input thereto is modulated by varying an electric field applied from the oscillator 15-1 (15-2). For example, where linearly polarized lights of two waves (signal lights) are introduced in orthogonal directions of 45 degrees and 135 degrees into the LiNbO3 waveguide 142, one of the signal lights exhibits a polarization variation of linear polarization of 45 degrees→clockwise circular polarization→linear polarization of 135 degrees→counterclockwise circular polarization→linear polarization of 45 degrees. The other signal light exhibits another polarization variation of linear polarization of 135 degrees→counterclockwise circular polarization→linear polarization of 45 degrees→clockwise circular polarization→linear polarization of 135 degrees. In other words, the polarization conditions of the two signal lights are scrambled while the two signal lights maintain a mutually orthogonal relationship.

Figure 12:
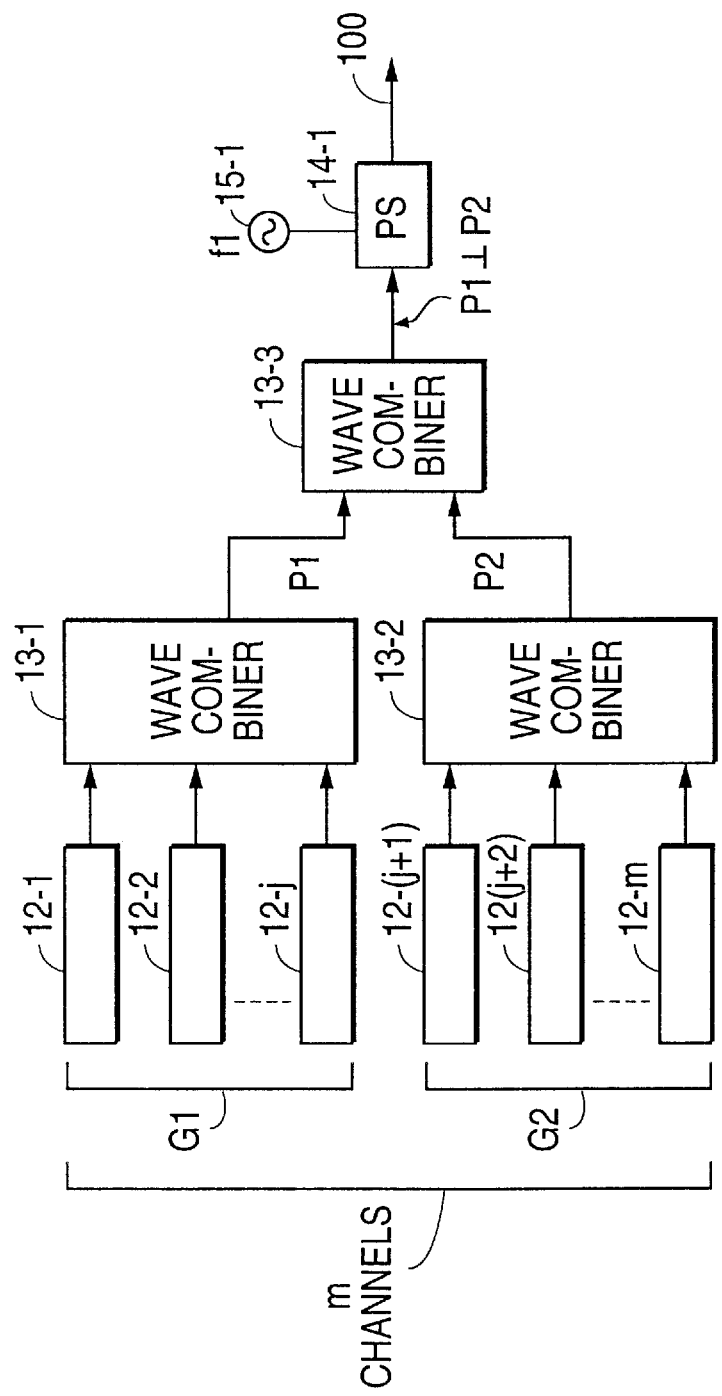
FIG. 12 is a diagram illustrating a polarization scrambling optical transmission system according to an embodiment of the present invention.

FIG. 12 is a diagram illustrating a polarization scrambling optical transmission system according to an embodiment of the present invention. Referring now to FIG. 12, the polarization scrambling optical transmission system includes signal light transmission sections 12-1 to 12-m (m is an integer) for the 1st to mth channels, wave combiners 13-1 to 13-3 each constructed using a 1:1 branching fixed polarization coupler, a polarization scrambler 14-1, and an oscillator 15-1 for producing a polarization scrambling frequency $f_1$ for the polarization scrambler 14-1.

The signal light transmission sections 12-1 to 12-m are divided, for example, into a first group G1 which includes the signal light transmission sections 12-1 to 12-j (where j<m), and a second group 2 G2 which includes the remaining signal light transmission sections 12-(j+1) to 12-m. The signal lights produced by the signal light transmission sections 12-1 to 12-j each have a polarization P1, and the signal lights produced by the signal light transmission sections 12- (j+1) to 12-m each have a polarization P2, where polarization P1 is orthogonal to P2 (P1⊥P2).

The signal lights of the first group G1 are combined by the wave combiner 13-1 into a wavelength division multiplexed signal light by wave combiner 13-1, which maintains the polarization of the signal lights. Similarly, the signal lights of the second group G2 are combined by the wave combiner 13-2 into a wavelength division multiplexed signal light by wave combiner 13-2, which maintains the polarization of the signal lights.

The wavelength division multiplexed signal lights of wave combiners 13-1 and 13-2 are combined by the wave combiner 13-3 to form a resulting wavelength division multiplexed signal light 100. Wave combiner 13-3 maintains the polarization conditions (P1⊥P2). The wavelength division multiplexed signal light 100 is polarization scrambled by polarization scrambler (PS) 14-2 with the scrambling frequency $f_1$ provided by the oscillator 15-1.

The polarization scrambler 14-1 has a construction as illustrated in FIG. 11, to apply polarization scrambling so that the polarization conditions of the wavelength division multiplexed signal lights output from wave combiners 13-1 and 13-2 are always orthogonal to each other.

Therefore, the wavelength division multiplexed signal light which is polarization scrambled by polarization scrambler 14-1 includes signal lights from the group G1 having the polarization condition P1 and signal lights from the group G2 having the polarization condition P2. The polarization is maintained so that P1 remains orthogonal to P2. Therefore, the polarizations input signals from groups G1 and G2 are collectively scrambled. As a result, the wavelength division multiplexed signal light 100 can be transmitted in a condition wherein the polarization conditions of adjacent channels are always orthogonal to, or different from, each other.

Accordingly, the influence from signal lights of adjacent channels can be reduced significantly and, consequently, the influence of non-linear optical effects can be suppressed.

Further, since polarization scrambling is performed with polarization directions orthogonal to each other by the polarization scrambler 14-1 for the signal lights from the signal light transmission sections 12-1 to 12-j of the group G1 and the signal lights from the signal light transmission sections 12-(j+1) to 12-m of the group G2, polarization scrambling can be performed with the equal frequency $f_1$ without performing polarization scrambling with different frequencies from each other. Consequently, the influence of non-linear optical effects caused by signal lights of adjacent channels can be suppressed, to thereby improve transmission quality of the resulting wavelength division multiplexed signal light.

The polarization directions P1 and P2 do not have to be orthogonal to each. However, they should be different from each other.

Figure 13:
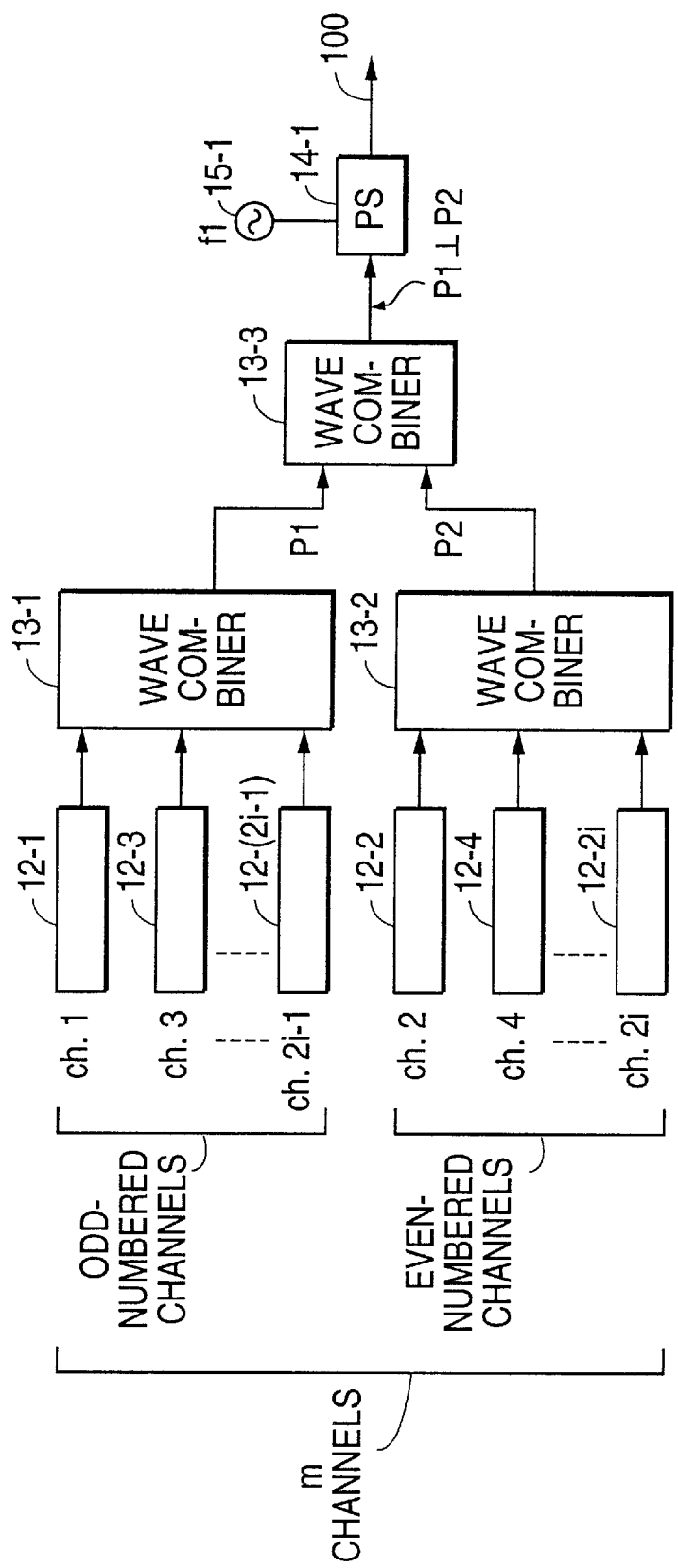
FIG. 13 is a diagram illustrating a polarization scrambling optical transmission system according to an embodiment of the present invention.

FIG. 13 is a diagram illustrating a polarization scrambling optical transmission system according to an embodiment of the present invention. Referring now to FIG. 13, the polarization scrambling optical transmission system includes signal light transmission sections 12-1 to 12-m (m is an integer) for the 1st to mth channels, wave combiners 13-1 to 13-3 each constructed using a 1:1 branching fixed polarization coupler, a polarization scrambler 14-1, and an oscillator 15-1 for producing a polarization scrambling frequency $f_1$ for the polarization scrambler 14-1.

The signal light transmission sections 12-1 to 12-m are divided, for example, into a group (odd-numbered channel group) of the signal light transmission sections 12-1, 12-3, . . . , 12-(2i−1) for the odd-numbered channels (ch.1, ch.3, ch.5, . . . ch.2i−1:i is an integer) and another group (even-numbered channel group) of the signal light transmission sections 12-2, 12-4, . . . , 12-2i for the even-numbered channels (ch.2, ch.4, ch.6, . . . , ch.2i).

From among signal lights for the 1st to mth channels, the signal lights can be counted from the short wavelength side or the long wavelength side.

Odd-numbered signal lights from the signal light transmission sections 12-1, 12-3, . . . , 12-(2i−1) are combined by the wave combiner 13-1 into a wavelength division multiplexed signal light, and have the same polarization condition P2. Similarly, even-numbered signal lights from the signal light transmission sections 12-2, 12-4, . . . , 12-2i are combined by the wave combiner 13-2 into a wavelength division multiplexed signal light, and have the same polarization condition P2. Polarization condition P1 is different from polarization condition P2.

Thereafter, the wavelength division multiplexed lights signals output from wave combiners 13-1 and 13-2 are combined into a wavelength division multiplexed signal light 100 by wave combiner 13-3. Wave combiner 13-3 maintains the polarization conditions of P1 and P2. The wavelength division multiplexed signal light 100 output from wave combiner 13-3 is polarization scrambled by polarization scrambler 14-1 with the frequency $f_1$ provided by oscillator 15-1. Thus, the input signals from the signal light transmission sections 12-1 to 12-m are collectively scrambled by polarization scrambler 14-1.

Figure 14:
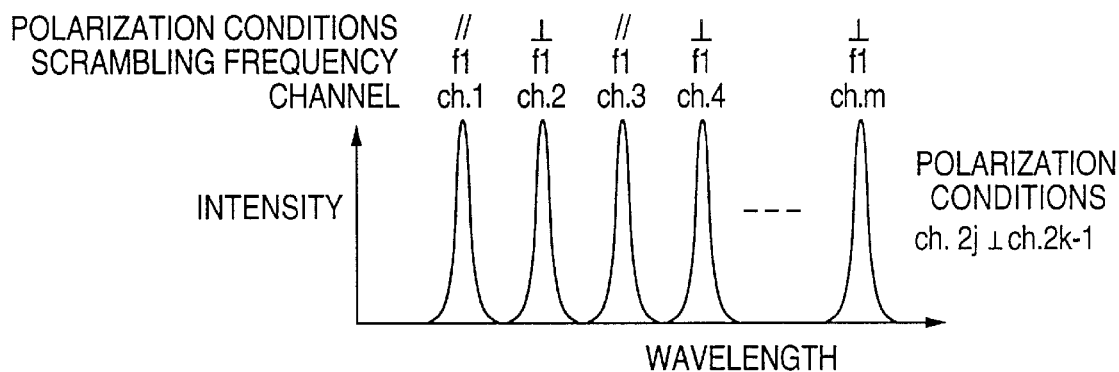
FIG. 14 is a graph illustrating the spectra of signal lights and a channel arrangement of the polarization scrambling optical transmission system illustrated in FIG. 13, according to an embodiment of the present invention.

FIG. 14 is a graph illustrating the optical spectra of signal lights and a channel arrangement of the polarization scrambling optical transmission system illustrated in FIG. 13, according to an embodiment of the present invention. Referring now to FIG. 14, the polarization conditions of signal lights of adjacent channels (ch.2j and ch.2k-1: where j and k are natural numbers) are different from (orthogonal to) each other.

Since the polarization conditions P1 and P2 of adjacent channels with which the influence of non-linear optical effects (such as FWM and XPM) is most significant can be made orthogonal to each other, the non-linear optical effects upon transmission of a wavelength multiple signal can be suppressed more effectively than those of the optical communication system illustrated in FIG. 12.

The polarization directions P1 and P2 do not necessarily have to be orthogonal to each other, but should be different from each other.

Figure 15:
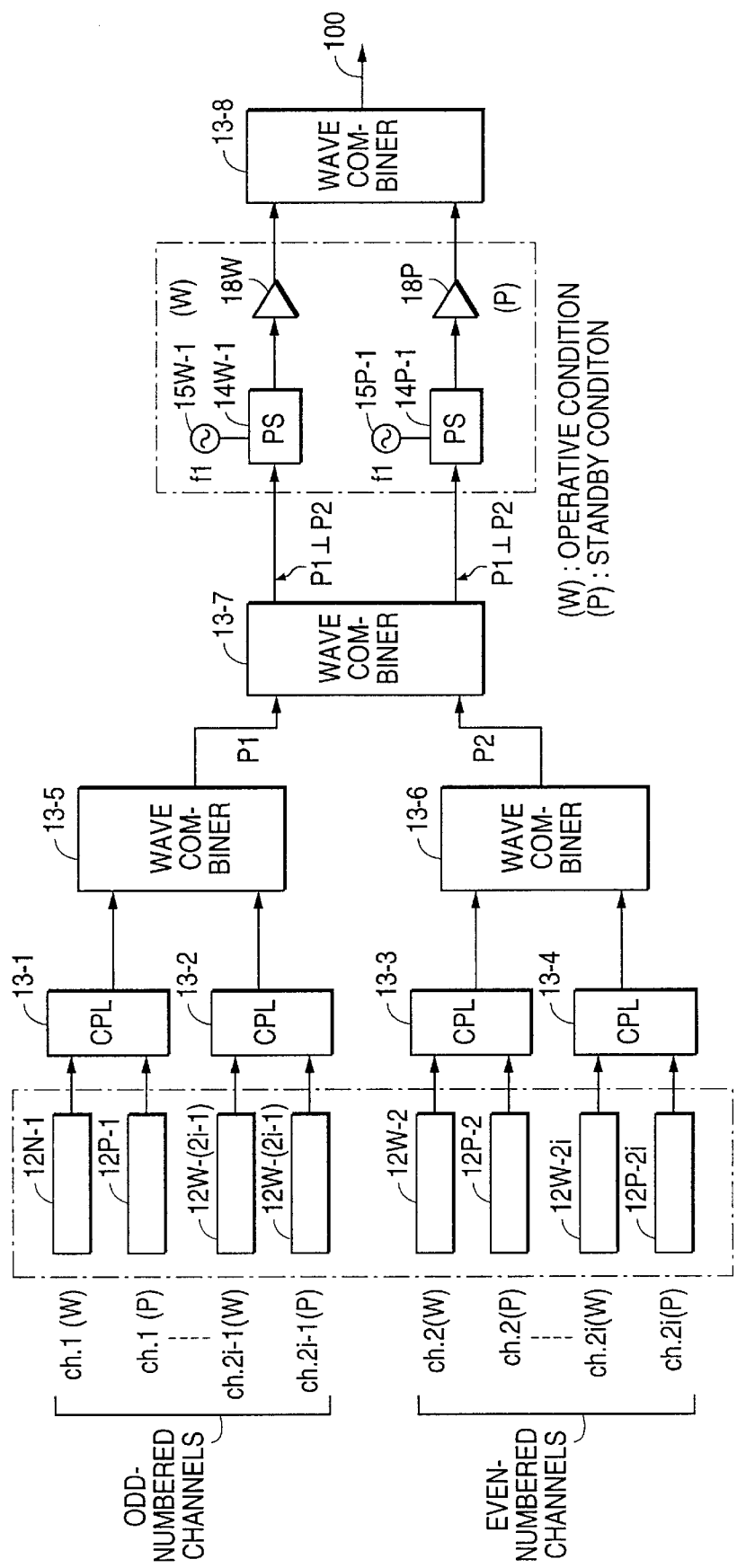
FIG. 15 is a diagram illustrating a polarization scrambling optical transmission system according to an embodiment of the present invention.

FIG. 15 is a diagram illustrating a polarization scrambling optical transmission system according to an embodiment of the present invention. Referring now to FIG. 15, a currently used, or "on-line" polarization scrambler 14W-1 is provided with a reserve (or "redundant") polarization scrambler 14P-1. Further, the signal light transmission sections 12-1 to 12-2i are individually provided with redundancy. For example, signal light transmission sections 12-1 to 12-2i are provided with reserve, or redundant, signal light transmission sections 12P-1 to 12P-2i so that the channels ch.1 to ch.2i are provided with redundancy in case of failure.

As previously described with reference to FIG. 10, a 1:1 branching fixed polarization coupler has two output ports without fail. Therefore, such a coupler is used for the wave combiner 13-7 to realize such duplication (redundant construction) as described above. Further, reference characters 15W-1 and 15P-1 denote currently used and reserve oscillators, respectively, and 18W and 18P denote currently used and reserve optical amplifiers, respectively.

Each of the optical amplifiers 18W and 18P serves, in its inoperative condition, as a switch for interrupting a signal light, but serves, in its operative condition, as a postamplifier. Therefore, the postamplifier (optical amplifier 18W) can be considered to be redundant.

In other words, where switching between the currently used polarization scrambler 14W-1 and the reserve polarization scrambler 14P-1 and switching between the currently used signal light transmission sections 12W-1 to 12W-2i and the reserve signal light transmission sections 12P-1 to 12P-2i are interlocked with each other, a component formed from active parts which are low in reliability can be made redundant.

Accordingly, even if the currently used polarization scrambler 14W-1 or the currently used signal light transmission sections 12W-1 to 12W-2i are rendered into an unusable condition, processing can be continued with the reserve polarization scrambler 14P-1 or the reserve signal light transmission sections 12P-1 to 12P-2i. As a result, the reliability of the system is significantly improved.

In FIG. 15, "box" 200 includes the currently used polarization scrambler 14W-1, reserve polarization scrambler 14P-1, currently used oscillator 15W-1, reserve oscillator 15P-1, currently used optical postamplifier 18W and reserve optical postamplifier 18P.

Figure 16:
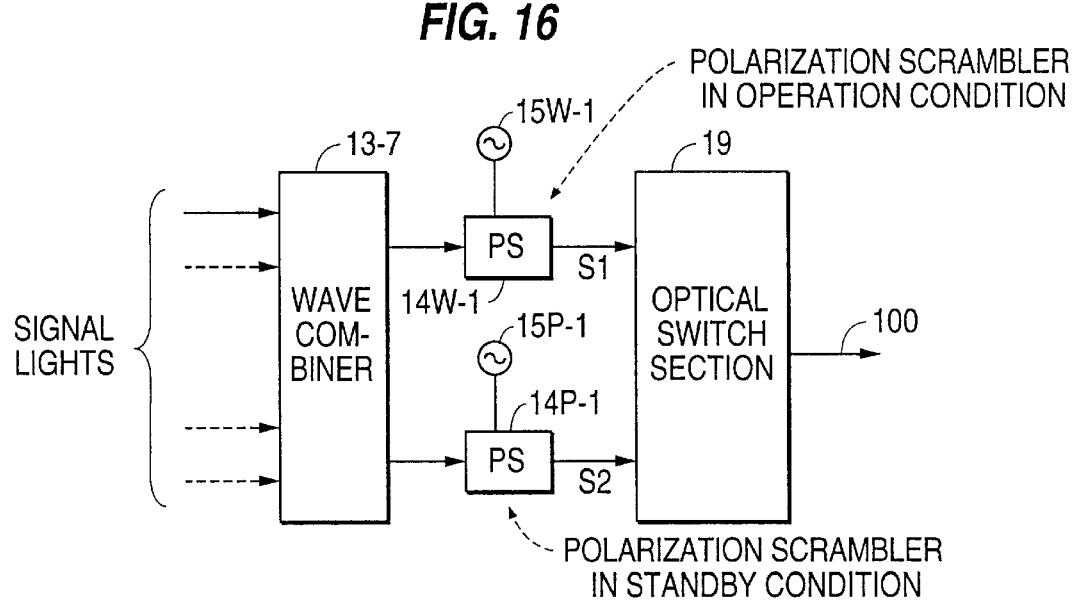
FIG. 16 is a diagram illustrating duplicate polarization scramblers for use in the polarization scrambling optical transmission system illustrated in FIG. 15, according to an embodiment of the present invention.

FIG. 16 is a diagram illustrating duplicate polarization scramblers for use in the polarization scrambling optical transmission system illustrated in FIG. 15, according to an embodiment of the present invention. Referring now to FIG. 16, box 200 illustrated in FIG. 15 could instead include, for example, a currently used polarization scrambler 14W-1, a reserve polarization scrambler 14P-1, a currently used oscillator 15W-1, a reserve oscillator 15P-1, an optical switch section 19 and wave combiner 17-7. Therefore, even if the currently used polarization scrambler 14W-1 or the currently used signal light transmission sections 12W-1 to 12W-2i are rendered into an unusable condition, processing can be continued with the reserve polarization scrambler 14P-1 or the reserve signal light transmission sections 12P-1 to 12P-2i by switching of the optical switch section 19.

Duplication of the signal light transmission sections 12-1 to 12-2i or duplication of the polarization scrambler 14-1 in this manner can be applied to virtually all of the above embodiments of the present invention, and to embodiments of the present invention as described below.

Figure 17:
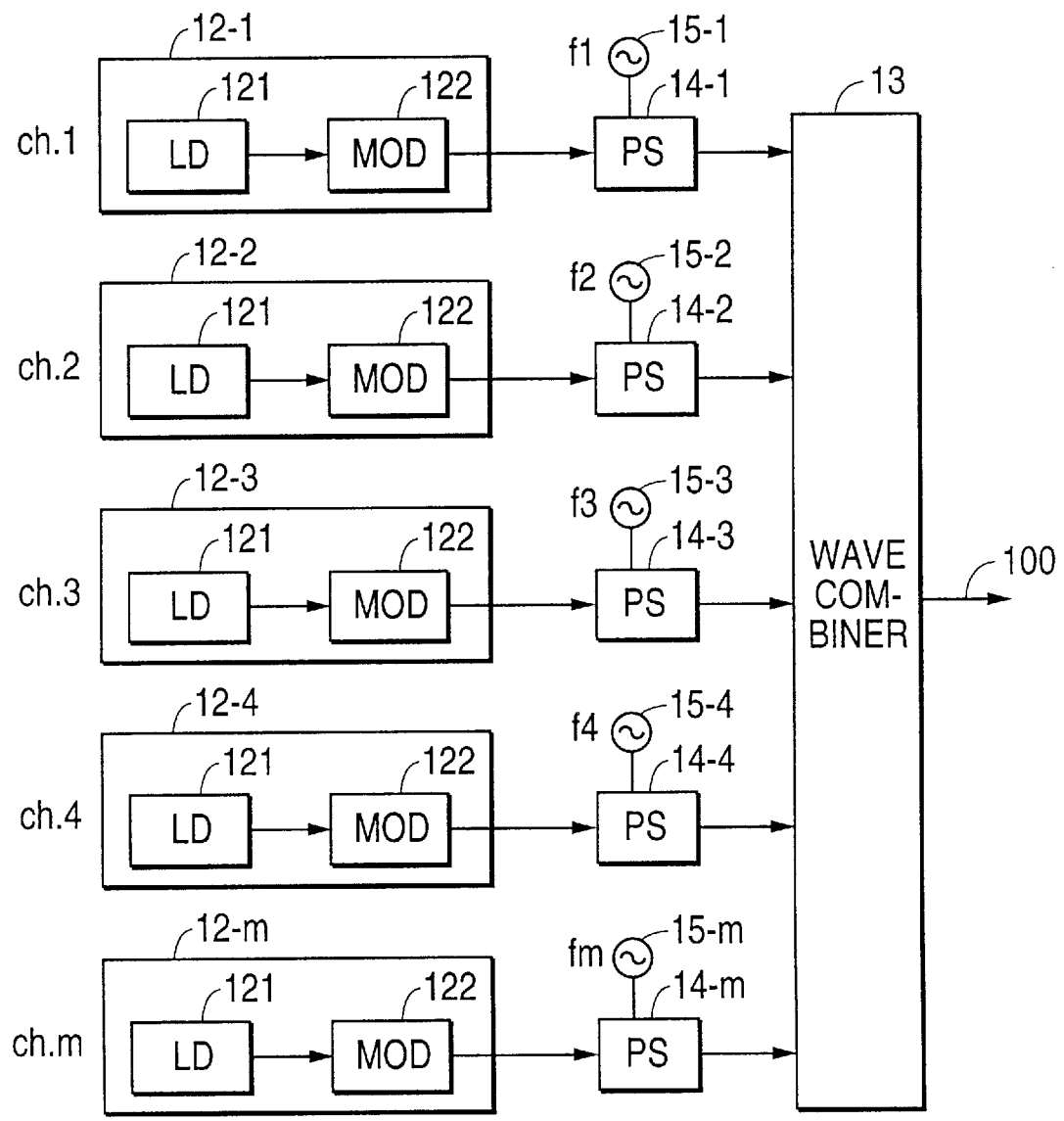
FIG. 17 is a diagram illustrating a polarization scrambling optical transmission system according to an embodiment of the present invention.

FIG. 17 is a diagram illustrating a polarization scrambling optical transmission system according to an embodiment of the present invention. Referring now to FIG. 17, the polarization scrambling optical transmission system includes signal light transmission sections 12-1 to 12-m (m is an integer) for a plurality of channels ch.1 to ch.m, each of which includes a laser diode (LD) 121 and a modulation section 122.

Polarization scramblers 14-1 to 14-m correspond, respectively, to the signal light transmission sections 12-1 to 12-m. Polarization scrambler receives signals having frequencies $f_1$ to $f_m$ for polarization scrambling from the corresponding oscillators 15-1 to 15-m form oscillators 15-1 to 15-m for scrambling the polarization of the signal lights from the signal light transmission sections 12-1 to 12-m. Frequencies $f_1$ to $f_m$ are different from each other.

Therefore, polarization scrambling is performed for all of wavelength multiplexed signal lights for the m channels with the frequencies $f_1$ to $f_m$ by the polarization scramblers 14-1 to 14-m, respectively, and the signal lights for all of the channels 1 to m are combined into a wavelength division multiplexed signal light 100 by the wave combiner 13. As a result, the relationship of the polarization conditions of the wavelength multiplexed signal lights varies periodically and is averaged among all of the signal lights. Therefore, the influence of non-linear optical effects such as FWM and XPM upon transmission of the wavelength division multiplexed signal light 100 is suppressed.

Figure 18:
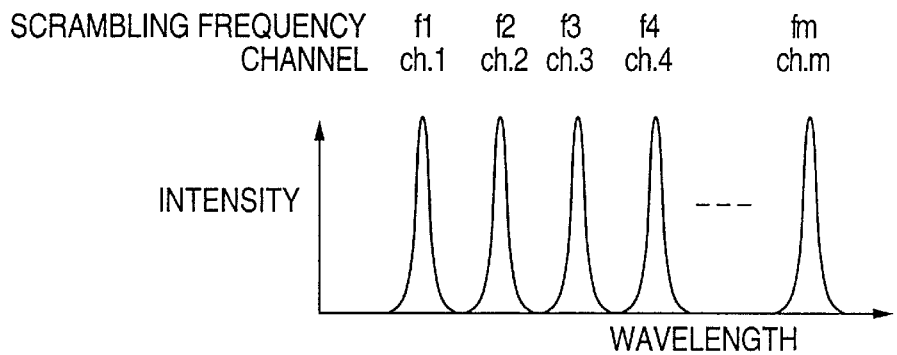
FIG. 18 is a graph illustrating the optical spectra of signal lights and a channel arrangement in the polarization scrambling optical transmission system illustrated in FIG. 17, according to an embodiment of the present invention.
Figure 19A:
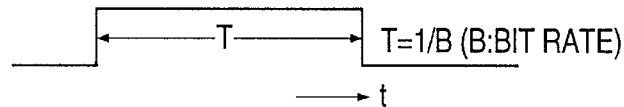
FIGS. 19(A) through 19(E) are diagrams illustrating the operation of the polarization scrambling optical transmission system illustrated in FIG. 17, according to an embodiment of the present invention.
Figure 19B:
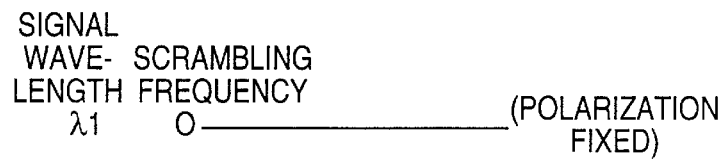
Figure 19C:
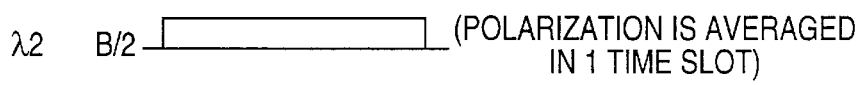
Figure 19D:
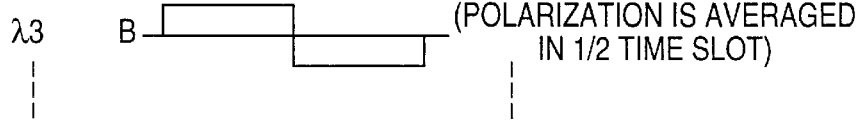
Figure 19E:
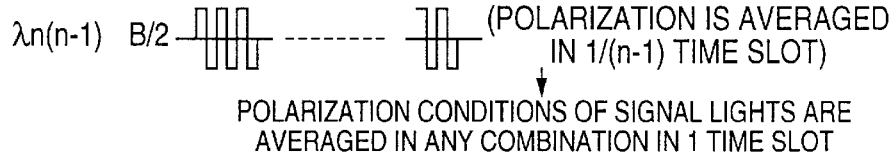

FIG. 18 is a graph illustrating the optical spectra of signal lights and a channel arrangement in the polarization scrambling optical transmission system illustrated in FIG. 17, according to an embodiment of the present invention.

The relationship of the polarization conditions is averaged among all of the signal lights by performing polarization scrambling for the signal lights with the different frequencies $f_1$ to $f_m$. More specifically, the generation efficiency of FWM between signal lights and generated in a wavelength division multiplexing optical system relies upon the non-linear constant of the optical fiber, the input light power, the difference between the zero dispersion wavelength and the signal light wavelength. It also relies upon the polarization directions of the signal lights. For example, it is known that the generation efficiency of FWM which is generated when three signal lights of different wavelengths non-linearly act upon one another in an optical fiber is, where the generation efficiency when all of the three signal lights have a same polarization direction is represented by "1", reduced to ⅜ in average value when the signal lights have individually arbitrary polarization directions.

Therefore, if polarization scrambling is performed for the individual wavelength multiplexed signal lights with the different frequencies $f_1$ to $f_m$ by the polarization scramblers 14-1 to 14-m, respectively, as described above, the signal lights are individually set to polarization directions (polarization conditions) different from each other. If the polarization directions of the signal lights are adjusted so as to rotate by the polarization scramblers 14-1 to 14-m, then the polarization conditions at every location of the transmission line are averaged over a sufficiently longer distance (time) than the period of the polarization scrambling.

In particular, where polarization scrambling for wavelength division multiplexed signal lights is performed with different periods (frequencies) in this manner, even if the polarization conditions of signal lights of a combination with which FWM is generated coincide with each other, the polarization conditions are put into different conditions at a next instant. Over a time (distance) sufficiently longer than the scrambling period, combinations of polarization conditions of the signal lights can be averaged to reduce the generation efficiency of FWM.

In the polarization scramblers 14-1 to 14-m, where polarization scrambling is performed for the signal lights with the frequencies $f_1$ to $f_m$ higher than B/2 (B: bit rate), the polarization conditions of lights which act upon each other within one bit of a signal are averaged and the generation efficiency of FWM between signal lights is suppressed.

Further, "0" (no modulation) can be added to the scrambling frequencies $f_1$ to $f_m$. In particular, the generation efficiency of FWM can be suppressed sufficiently even if, for example, the construction shown in FIG. 17 is modified such that the polarization scrambler 14-1 is omitted and polarization scrambling is performed for the signal lights at least from the signal light transmission sections 12-1 to 12-m with the individually different frequencies $f_2$ to $f_m$ (when m>2) or with the frequency $f_2$ (when m=2). In this instance, however, the polarization scrambling frequency must have different values between signal lights of adjacent channels.

The addition of "0" (no modulation) as a frequency value to the scramble frequencies $f_1$ to $f_m$ can be applied to all the embodiments of the present invention described herein.

In this manner, with the polarization scrambling optical transmission system of the present embodiment, by performing polarization scrambling for the wavelength multiplexed signal lights for the m channels with the frequencies $f_1$ to $f_m$ different from each other, the relationship between the polarization conditions of the signal lights is averaged among all of the signal lights to transmit a wavelength division multiplexed signal light. Accordingly, the influence of non-linear optical effects upon the transmission of a wavelength division multiplexed signal light can be suppressed.

In combinations of signal lights which provide the highest generation efficiency of FWM, a mutual action between signal lights which have a small difference in light frequency therebetween, that is, between adjacent signal lights, most influences the transmission characteristic. Therefore, the polarization scrambling frequencies of signal lights of adjacent channels should be combined so that they are different as much as possible. Here, since the operation range of polarization scrambling is several tens GHz to the utmost, the number of possible scrambling frequencies is limited. Such a limited number of scrambling frequencies are combined so that signal lights of adjacent channels may have frequency values different from each other as much as possible.

Figure 20:
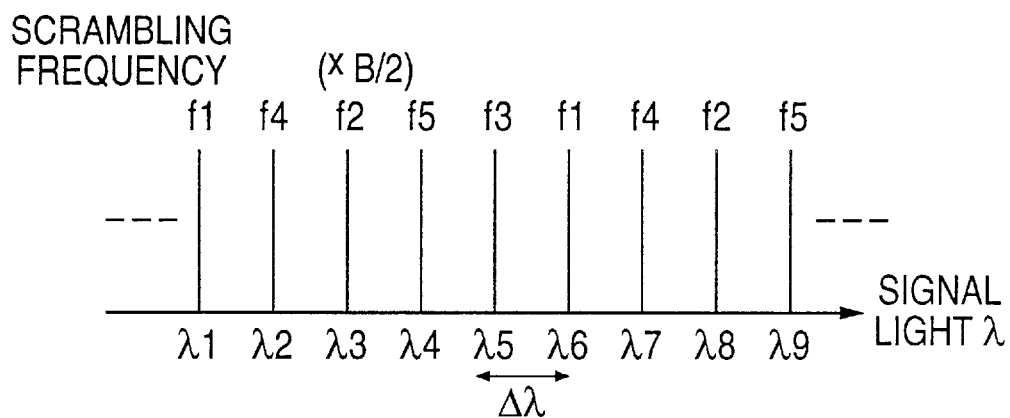
FIG. 20 is a diagram illustrating the operation of the polarization scrambling optical transmission system illustrated in FIG. 17, according to an embodiment of the present invention.
Figure 21:
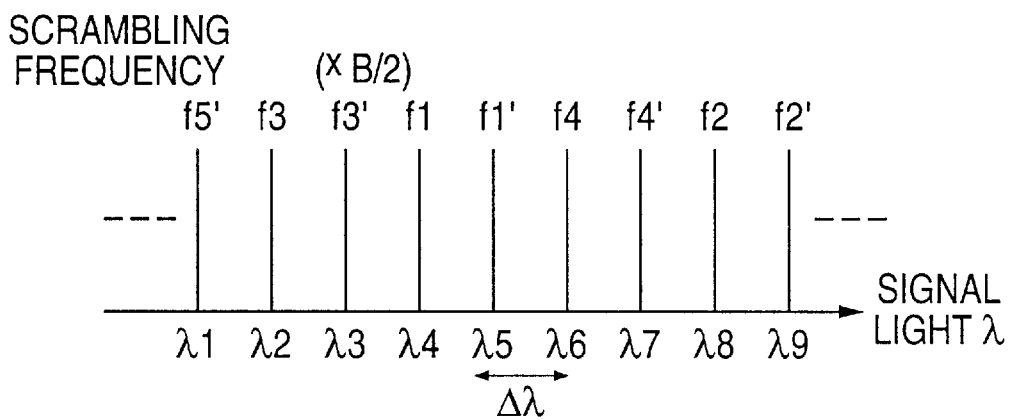
FIG. 21 is a diagram illustrating the operation of the polarization scrambling optical transmission system illustrated in FIG. 17, according to an embodiment of the present invention.

Now, where it is assumed that the number of possible scrambling frequencies is five given by $f_n = B/2 \times n$ (where n=1 to 5), if the scrambling frequency is set, for example, to $f_1$, $f_4$, $f_2$, $f_5$, $f_3$, $f_1$, . . . for the wavelengths ($\lambda 1$, $\lambda 2$, $\lambda 3$, . . . ) of signal lights as seen in FIG. 20, then the scrambling frequencies for signal lights of adjacent channels are different by more than B (bit rate) without fail and signal lights of equal frequencies appear at locations spaced by $5 \times \Delta \lambda$ (where $\Delta \lambda$ is a distance between signal wavelengths). Consequently, the generation efficiency of FWM can be suppressed further effectively.

The reason why the basic scrambling frequency is set to $f_n = B/2$ will be described briefly. For example, where two signal lights (signal lights for two channels) are considered, the generation efficiency of non-linear optical effects such as FWM exhibits its highest value or lowest value when the polarization conditions of two signal lights are parallel to each other or orthogonal to each other. In any other polarization condition, the generation efficiency varies depending upon to which degree the polarizations are similar. Accordingly, when pulses of the two signal lights rise or fall at a time, if the polarization of one of the signal lights is fixed, then the polarizations within one time slot are averaged when the polarization of the other pulse changes from a parallel condition to an orthogonal condition with respect to the pulse of the one signal light within the pulse.

Accordingly, the scrambling frequency (B/2) with which the polarization is rotated by one half period within one time slot is effective to reduction in generation efficiency of FWM, and it is effective to employ the scrambling frequency as a polarization scrambling basic frequency.

Further, it is very effective to make the polarization directions of signal lights of adjacent channels orthogonal to each other. In particular, even if the polarization scrambling frequencies of signal lights of adjacent channels are equal, if the polarization directions always remain orthogonal to each other, then the generation efficiency of FWM by the two waves is theoretically (in an ideal fiber free from polarization dispersion) zero. Accordingly, if the generation efficiency with signal lights of a combination which provides a highest generation efficiency of FWM can be reduced to zero, then the influence of FWM can be reduced significantly.

For example, consider a case where the influence by polarization dispersion of a transmission line is small (that is, where a transmission line having a low polarization dispersion is employed or in a system of approximately several hundreds kilometers within which the influence of polarization dispersion is not significant). If signal lights are introduced into polarization scramblers on the transmission side of the transmission line such that the signal lights of adjacent channels are orthogonal to each other by setting the polarization directions of the incident lights to the polarization scramblers to +45 degrees and −45 degrees or displacing the phases of electric signals to be applied for modulation by 180 degrees from each other and polarization scrambling is performed with an equal frequency which may be substantially equal to the bit rate (B), then the polarization directions of the signal lights can be maintained in an orthogonal condition substantially fixedly during transmission. Consequently, a mutual action of signal lights of adjacent channels which are a combination which exhibits a highest FWM generation efficiency can be almost removed, and the influence of FWM can be reduced significantly.

However, even where the polarization conditions of signal lights of adjacent channels are orthogonal to each other in this manner, the polarization condition of any of the signal lights still coincides with the polarization condition of another signal which is outside the signals and has an equal frequency, thereby resulting in generation of four wave mixing by an amount corresponding to the distance in wavelength between them.

FIG. 20 is a diagram illustrating the operation of the polarization scrambling optical transmission system illustrated in FIG. 17, according to an embodiment of the present invention. If different sets each including two signal lights whose polarization conditions are set so as to be orthogonal to each other ($\lambda 2$ and $\lambda 3$, $\lambda 4$ and $\lambda 5$, and so forth) are arranged in wavelength in such a combination as illustrated in FIG. 20, then the generation efficiency of FWM by a combination of signal lights other than signal lights of adjacent channels can be reduced.

Figure 22:
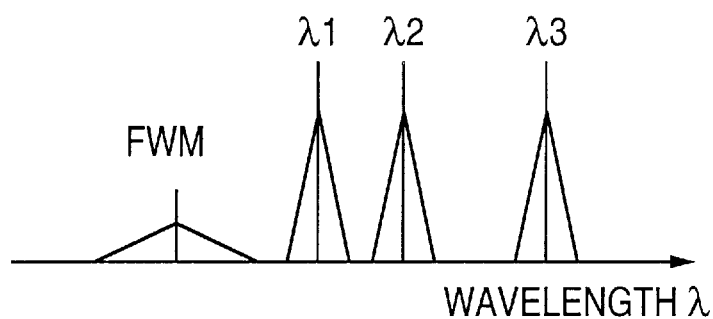
FIG. 22 is a diagram illustrating the operation of the polarization scrambling optical transmission system illustrated in FIG. 17, according to an embodiment of the present invention.
Figure 23:
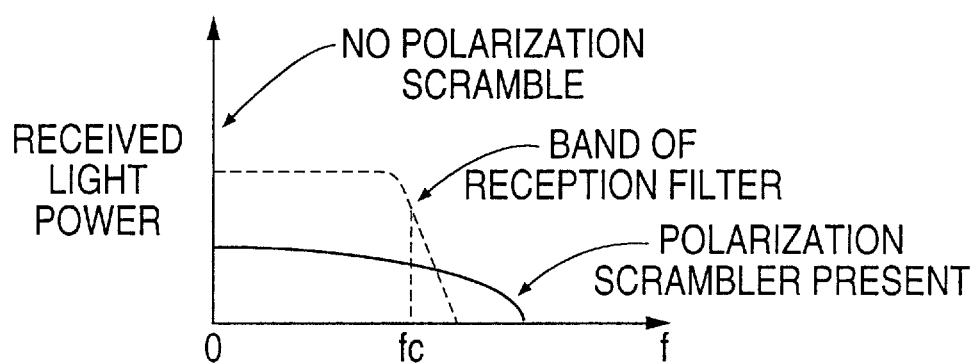
FIG. 23 is a diagram illustrating the operation of the polarization scrambling optical transmission system illustrated in FIG. 17, according to an embodiment of the present invention.

FIG. 22 is a diagram illustrating the operation of the polarization scrambling optical transmission system illustrated in FIG. 17, according to an embodiment of the present invention. Since polarization scrambling is equivalent to phase modulation (frequency modulation), polarization scrambling expands spectra of signal lights, for example, as illustrated in FIG. 22. Accordingly, the spectrum of FWM generated is expanded. In this instance, if the scrambling frequency is approximately equal to the bit rate (B), then the spectrum of FWM partially comes out of the band of the reception filter as illustrated in FIG. 23. As a result, noise components by the FWM input to the receiver can be reduced.

Figure 24:
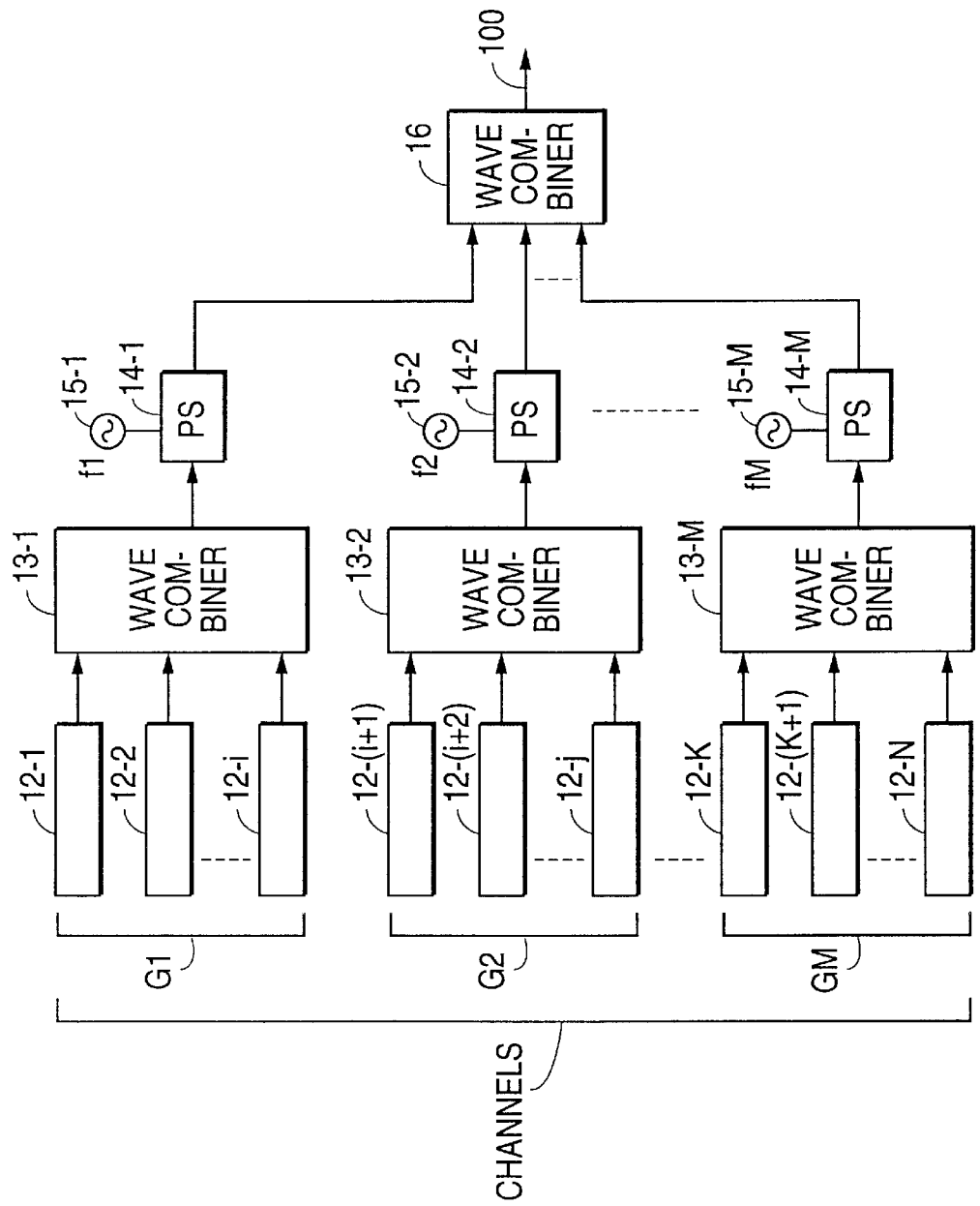
FIG. 24 is a diagram illustrating a polarization scrambling optical transmission system according to an embodiment of the present invention.

FIG. 24 is a diagram illustrating a polarization scrambling optical transmission system according to an embodiment of the present invention. Referring now to FIG. 24, the polarization scrambling optical transmission system includes signal light transmission sections 12-1 to 12-N (N is an integer) for generating and outputting a plurality of signal lights of different channels (ch.1 to ch.N) to be wavelength multiplexed, wave combiners 13-1 to 13-M (where M<N) and 16 for combining and wavelength multiplexing input signal lights thereto, polarization scramblers 14-1 to 14-M, and oscillators 15-1 to 15-M for oscillating signals of different frequencies $f_1$ to $f_m$ from each other for the polarization scramblers 14-1 to 14-M.

As illustrated in FIG. 24, the signal light transmission sections 12-1 to 12-N are divided into a plurality of groups (G1 to GM) including a first group G1 which includes the signal light transmission sections 12-1 to 12-i (where i<N), a second group G2 which includes the signal light transmission sections 12-(i+1) to 12-j (where i+1<j<N), ..., and an Mth group GM which includes the signal light transmission sections 12-k to 12-N (where j<k<N). Polarization scrambling is performed for the groups G1 to GM with the different frequencies $f_1$ to $f_m$ from each other by the polarization scramblers 14-1 to 14-M, respectively.

Therefore, polarization scrambling for a pair of signal lights from one group is performed with the same frequency by a corresponding one of the polarization scramblers 14-1 to 14-M. However, polarization scrambling for a pair of signal lights from different groups is performed with frequencies $f_1$ to $f_m$ different from each other by different corresponding ones of the polarization scramblers 14-1 to 14-M.

Moreover, wavelength division multiplexed signal lights for N channels are produced by the wave combiners 13-1 to 13-M in units of several channels for the individual groups G1 to GM. Then, polarization scrambling is performed by the polarization scramblers 14-1 to 14-M, with the same frequency for signal lights from a same group but with the different frequencies for the signal lights of other groups. The signal lights of all of the channels are combined by and output from the wave combiner 16.

Accordingly, comparing with the system illustrated in FIG. 24 with the system illustrated in FIG. 17, the system illustrated in FIG. 24 can reduce the number of polarization scramblers from m to M and can average, with a simplified construction, the relationship of the polarization conditions of signal lights.

If each of the polarization scramblers 14-1 to 14-M is duplicated to include a currently used polarization scrambler and a reserve polarization scrambler as described hereinabove with reference to FIG. 15, then the reliability of the system can be improved significantly.

Figure 25:
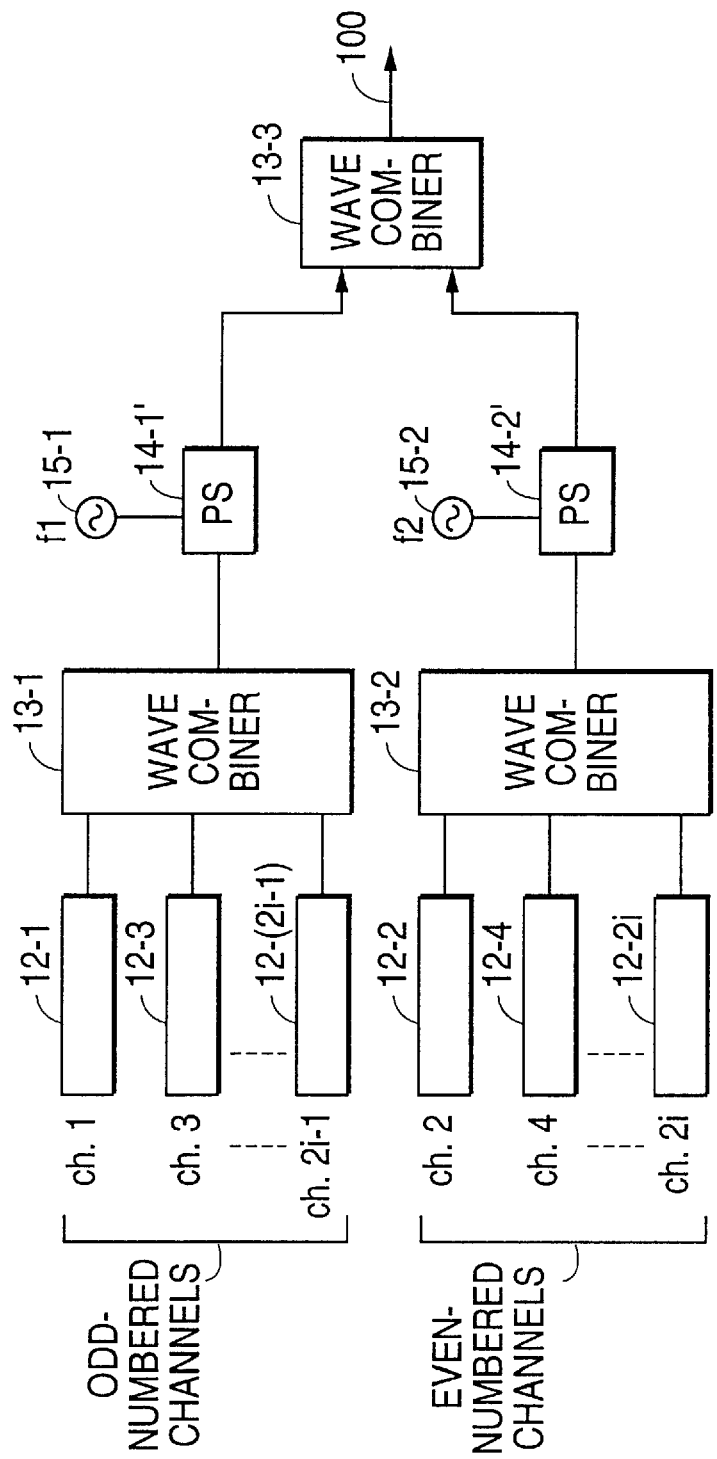
FIG. 25 is a diagram illustrating a polarization scrambling optical transmission system according to an embodiment of the present invention.

FIG. 25 is a diagram illustrating a polarization scrambling optical transmission system according to an embodiment of the present invention. Referring now to FIG. 25, the polarization scrambling optical transmission system includes signal light transmission sections 12-1 to 12-2i (i is an integer) for generating a plurality of signal lights of different channels (ch.1 to ch.2i) to be wavelength multiplexed, wave combiners 13-1 to 13-3 for combining and wavelength multiplexing input signal lights, a pair of polarization scramblers 14-1 and 14-2, and a pair of oscillators 15-1 and 15-2 for oscillating signals of frequencies $f_1$ and $f_2$ different from each other for the polarization scramblers 14-1 and 14-2, respectively.

The signal light transmission sections 12-1 to 12-2i are divided into a group of signal lights of the odd-numbered channels (ch.1, ch.3, ..., ch.2i−1) (signal light transmission sections 12-1, 12-3, ..., 12-(2i−1)) and another group of signal lights of the even-numbered channels (ch.2, ch.4, ..., ch.2i) (signal light transmission sections 12-2, 12-4, ..., 12-2i).

Therefore, the plurality of signal light transmission sections 12-1 to 12-2i in FIG. 24 have been divided in FIG. 25 into a group of the odd-numbered channels and another group of the even-numbered channels, and the plurality of polarization scramblers 14-1 to 14-M are constructed as two polarization scramblers 14-1' and 14-2'.

Here, the polarization scrambler 14-1' performs polarization scrambling for signal lights from the signal light transmission sections 12-1, 12-3, ..., 12-(2i−1), which form the group of signal lights of the odd-numbered channels, with a frequency $f_1$. The polarization scrambler 14-2' performs polarization scrambling for signal lights from the signal light transmission sections 12-2, 12-4, ..., 12-2i, which form the group of signal lights of the even-numbered channels, with a frequency $f_2$ different from the frequency $f_1$.

Of wavelength multiplexed signal lights of the plurality of channels (ch.1 to ch.2i), the odd-numbered ones as counted from the short wavelength side or the long wavelength side. That is, the signal lights from the signal light transmission sections 12-1, 12-3, ..., 12-(2i−1) are first combined by the wave combiner 13-1 and then polarization scrambled with the equal frequency $f_1$ by the polarization scrambler 14-1'. Similarly, the even-numbered signal lights as counted from the short wavelength side or the long wavelength side. That is, the signal lights from the signal light transmission sections 12-2, 12-4, ..., 12-2i are first combined by the wave combiner 13-2 and then polarization scrambled with the frequency $f_2$ by the other polarization scrambler 14-2'.

Thereafter, the signal lights of all of the channels output from the polarization scramblers 14-1' and 14-2' are combined by the wave combiner 13-3 and then output as a wavelength division multiplexed signal light 100.

Figure 26:
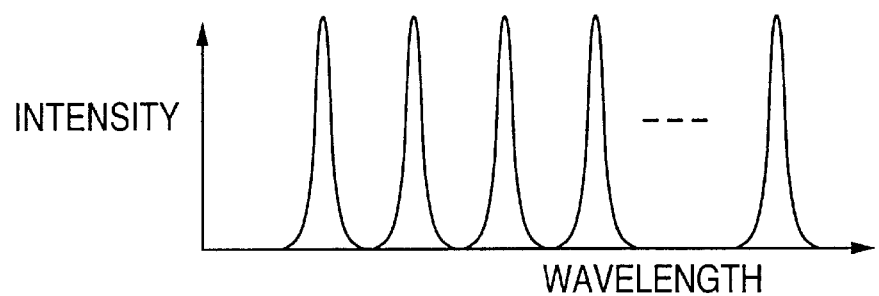
FIG. 26 is a graph illustrating an optical spectra of signal lights and a channel arrangement of the polarization scrambling optical transmission system illustrated in FIG. 25, according to an embodiment of the present invention.

FIG. 26 is a graph illustrating an optical spectra of signal lights and a channel arrangement of the polarization scrambling optical transmission system illustrated in FIG. 25, according to an embodiment of the present invention. In particular, by dividing the plurality of signal light transmission sections 12-1 to 12-2i into the group of signal lights of the odd-numbered channels and the group of signal lights of the even-numbered channels, the frequencies of signal lights of adjacent channels are put into a condition (polarization condition) wherein they are different by a fixed frequency from each other. Further, by performing polarization scrambling for the signal lights from the odd-numbered channel group and the signal lights from the even-numbered channel group with different frequencies $f_1$ and $f_2$, the polarization conditions of signal lights of adjacent channels can be put into a condition wherein they are different by a greater amount from each other. In this manner, the relationship of the polarization conditions of signal lights of adjacent channels with which the influence of non-linear optical effects such as FWM and XPM appears most significantly can be varied and averaged, and the transmission quality can be improved.

Further, since only two polarization scramblers 14-1' and 14-2' are required in FIG. 25, the system has a relatively simple construction.

The reliability of the system illustrated in FIG. 26 can be further improved if each of the polarization scramblers 14-1' and 14-2' is duplicated to include a currently used polarization scrambler and a reserve polarization scrambler, as previously described with reference to FIG. 15.

According to the above embodiments of the present invention, if polarization scrambling is performed for the wavelength multiplexed signal lights of all of the plurality of channels with the respective frequencies different from each other, then the relationship of the polarization conditions of signal lights of adjacent channels can be varied to average and reduce the influence of non-linear optical effects. However, even if polarization scrambling is performed for the signal lights or light of at least certain ones or a certain one of the plurality of channels with different scrambling frequencies, the influence of non-linear optical effects can be sufficiently reduced.

Meanwhile, if, when polarization scrambling is performed for the signal light of an aimed channel with a predetermined frequency, a frequency difference between the frequency of the polarization scrambling performed for the signal light of the aimed channel and a frequency of polarization scrambling performed for the signal light of an adjacent channel adjacent the signal light of the aimed channel is set larger than a frequency difference between the frequency of the polarization scrambling performed for the signal light of the aimed channel and a frequency of polarization scrambling performed for the signal light of a non-adjacent channel which is not adjacent the signal light of the aimed channel, the polarization conditions of signal lights of adjacent channels can be put into a condition wherein they are different by a greater amount from each other. As a result, the influence of non-linear optical effects caused by a mutual action of signal lights of adjacent channels can be suppressed to improve the transmission quality of the resulting wavelength division multiplexed signal light.

In the above embodiments of the present invention, various lights are described as being "adjacent". For example, two signal lights are defined as being adjacent when the frequencies of the respective signal lights are adjacent to each other in a frequency spectrum, without the frequency of a different signal light therebetween.

In any of the above embodiments of the present invention, the polarization of signal lights can be arranged to be different for each signal light before the polarization of the signal lights are polarization scrambled. Alternatively, the polarization of some of the signal lights can be arranged to be different from the polarization of some other signal lights, before the signal lights are polarization scrambled. Moreover, the polarization of signal lights can be arranged to be either a first or a second polarization before being polarization scrambled, where the first polarization is orthogonal to the second polarization.

In the above embodiments of the present invention, the terms "signal lights" and "channels" are used interchangeably. For example, each signal light represents a different channel. In addition, signal lights can be described as being "adjacent", while channels can also be described as being adjacent. Moreover, a plurality of signals can be described as being combined into a wavelength division multiplexed signal light, but a plurality of channels could also be described as being combined into a wavelength division multiplexed signal light.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for scrambling a polarization of signal lights, comprising the steps of:

scrambling the polarization of a signal light with a scrambling frequency; and combining the polarization scrambled signal light with at least one other signal light to form a wavelength division multiplexed signal light, wherein the step of scrambling comprises the steps of scrambling the polarization of a first signal light with a first scrambling frequency, and scrambling the polarization of a second signal light with a second scrambling frequency which is different from the first scrambling frequency, and the step of combining comprises the step of combining the first and second polarization scrambled signal lights to form the wavelength division multiplexed signal light.

2. A method as in claim 1, wherein the polarization of the first signal light is different from the polarization of the second signal light before the first and second signal lights are scrambled.

3. A method for scrambling a polarization of signal lights, comprising the steps of:

scrambling the polarization of a signal light with a scrambling frequency; and combining the polarization scrambled signal light with at least one other signal light to form a wavelength division multiplexed signal light, wherein the step of scrambling comprises the step of scrambling the polarization of a plurality of signal lights, the polarization of each signal light being scrambled at a different scrambling frequency, and the step of combining comprises the step of combining the plurality of polarization scrambled signal lights to form the wavelength division multiplexed signal light.

4. A method as in claim 3, wherein each signal light of the plurality of signal lights has a different frequency, and respective signal lights are defined as being adjacent when the frequencies of the respective signal lights are adjacent to each other in a frequency spectrum without the frequency of a different signal light therebetween, and, for a respective signal light having an adjacent signal light and a non-adjacent signal light, a frequency difference exists between the scrambling frequency of the respective signal light and the scrambling frequency of the adjacent signal light, and a frequency difference exists between the scrambling frequency of the respective signal light and the scrambling frequency of the non-adjacent signal light, and the frequency difference between the scrambling frequency of the respective signal light and the scrambling frequency of the adjacent signal light is larger than the frequency difference between the scrambling frequency of the respective signal light and the scrambling frequency of the non-adjacent signal light.

5. A method as in claim 3, wherein each signal light of the plurality of signal lights has a different frequency, and respective signal lights are defined as being adjacent when the frequencies of the respective signal lights are adjacent to each other in a frequency spectrum without the frequency of a different signal light therebetween, and, before the polarization of the plurality of signal lights is scrambled, the polarization of each signal light is different from the polarization of signal lights adjacent to the respective signal light.

6. A method for scrambling a polarization of signal lights, comprising the steps of:

scrambling the polarization of a signal light with a scrambling frequency; and combining the polarization scrambled signal light with at least one other signal light to form a wavelength division multiplexed signal light, wherein the step of scrambling comprises the step of scrambling the polarization of a plurality of signal lights, the polarization of each signal light being scrambled at a the same scrambling frequency, and the step of combining comprises the step of combining the plurality of polarization scrambled signal lights to form a wavelength division multiplexed signal light, where each signal light of the plurality of signal lights has a different frequency, and respective signal lights are defined as being adjacent when the frequencies of the respective signal lights are adjacent to each other in a frequency spectrum without the frequency of a different signal light therebetween, and, before the polarization of the plurality of signal lights is scrambled, the polarization of each signal light is different from the polarization of signal lights adjacent to the respective signal light.

7. A method as in claim 6, wherein the polarization of adjacent signal lights is orthogonal to each other.

8. A method for scrambling a polarization of signal lights, comprising the steps of:

scrambling the polarization of a signal light with a scrambling frequency; and combining the polarization scrambled signal light with at least one other signal light to form a wavelength division multiplexed signal light, wherein the step of scrambling comprises the steps of combining a first plurality of signal lights to form a first wavelength division multiplexed signal light, combining a second plurality of signal lights, different from the first plurality of signal lights, to form a second wavelength division multiplexed signal light, scrambling the polarization of the first wavelength division multiplexed signal light with a first scrambling frequency, and scrambling the polarization of the second wavelength division multiplexed signal light with a second scrambling frequency which is different from the first scrambling frequency; and the step of combining comprises the step of combining the polarization scrambled first wavelength division multiplexed signal light with the polarization scrambled second wavelength division multiplexed signal light, to produce a resulting wavelength division multiplexed signal light.

9. A method as in claim 8, wherein each signal light of the first and second plurality of signal lights has a different frequency, and respective signal lights are defined as being adjacent when the frequencies of the respective signal lights are adjacent to each other in a frequency spectrum without the frequency of a different signal light therebetween, and, before the polarization of the first and second wavelength division multiplexed signal lights is scrambled, the polarization of each signal light of the first and second plurality of signal lights is different from the polarization of adjacent signal lights.

10. A method as in claim 9, wherein, before the polarization of the first and second wavelength division multiplexed signal lights is scrambled, the polarization of each signal light of the first and second plurality of signal lights is different.

11. A method as in claim 9, wherein, before the polarization of the first and second wavelength division multiplexed signal lights is scrambled, the polarization of each signal light of the first plurality of signal lights is the same and is defined as a first polarization, and the polarization of each signal light of the second plurality of signal lights is the same and is defined as a second polarization, the first polarization being orthogonal to the second polarization.

12. A method for scrambling a polarization of signal lights, comprising the steps of:

scrambling the polarization of a signal light with a scrambling frequency; and combining the polarization scrambled signal light with at least one other signal light to form a wavelength division multiplexed signal light, wherein N signal lights each have a different frequency, the signal lights being defined as a first through an Nth signal light as numbered in order along a frequency spectrum of the different frequencies, the step of scrambling comprises the steps of
combining even numbered signal lights to form a first wavelength division multiplexed signal light,
combining odd numbered signal lights to form a second wavelength division multiplexed signal light,
scrambling the polarization of the first wavelength division multiplexed signal light with a first scrambling frequency, and
scrambling the polarization of the second wavelength division multiplexed signal light with a second scrambling frequency which is different from the first scrambling frequency; and the step of combining comprises the step of
combining the polarization scrambled first wavelength division multiplexed signal light with the polarization scrambled second wavelength division multiplexed signal light, to produce a resulting wavelength division multiplexed signal light.

13. A method for scrambling a polarization of signal lights, comprising the steps of:
scrambling the polarization of a signal light with a scrambling frequency; and
combining the polarization scrambled signal light with at least one other signal light to form a wavelength division multiplexed signal light, wherein
N signal lights each have a different frequency, the signal lights being defined as a first through an Nth signal light as numbered in order along a frequency spectrum of the different frequencies, the N signal lights including a plurality of even numbered signal lights having a first polarization, a plurality of even numbered signal lights having a second polarization, a plurality of odd numbered signal lights having the first polarization, and a plurality of odd numbered lights having the second polarization, the first polarization being different from the second polarization, the step of scrambling comprises the steps of
combining even numbered signal lights having the first polarization to form a first wavelength division multiplexed signal light,
combining even numbered signal lights having the second polarization to form a second wavelength division multiplexed signal light,
combining odd numbered signal lights having the first polarization to form a third wavelength division multiplexed signal light,
combining odd numbered signal lights having the second polarization to form a fourth wavelength division multiplexed signal light,
combining the first and second wavelength division multiplexed signal lights to form a fifth wavelength division multiplexed signal light,
combining the third and fourth wavelength division multiplexed signal lights to form a sixth wavelength division multiplexed signal light,
scrambling the polarization of the fifth wavelength division multiplexed signal light with a first scrambling frequency, and
scrambling the polarization of the sixth wavelength division multiplexed signal light with a second scrambling frequency which is different from the first scrambling frequency, and the step of combining comprises the step of
combining the polarization scrambled fifth wavelength division multiplexed signal light with the polarization scrambled sixth wavelength division multiplexed signal light, to produce a resulting wavelength division multiplexed signal light.

14. A method for scrambling a polarization of signal lights, comprising the steps of:
combining first and second signal lights to form a resulting wavelength division multiplexed signal light, the first and second signal lights having different polarization; and
scrambling the polarization of the resulting wavelength division multiplexed signal light, wherein
the step of combining includes the step of
combining a plurality of signal lights to form the resulting wavelength division multiplexed signal, each of the signal lights having either a first polarization or a second polarization, the first polarization being orthogonal to the second polarization.

15. A method for scrambling a polarization of signal lights, comprising the steps of:
combining first and second signal lights to form a resulting wavelength division multiplexed signal light, the first and second signal lights having different polarization; and
scrambling the polarization of the resulting wavelength division multiplexed signal light, wherein
the step of combining includes
combining a first plurality of signal lights to form a first wavelength division multiplexed signal light, each signal light of the first plurality of signal lights having a first polarization,
combining a second plurality of signal lights, different from the first plurality of signal lights, to form a second wavelength division multiplexed signal light, each signal light of the second plurality of signal lights having a second polarization which is different from the first polarization, and
combining the first and second wavelength division multiplexed signal lights to form the resulting wavelength division multiplexed signal light.

16. A method as in claim 15, wherein the first polarization is orthogonal to the second polarization.

17. A method for scrambling a polarization of signal lights, comprising the steps of:
combining first and second signal lights to form a resulting wavelength division multiplexed signal light, the first and second signal lights having different polarization; and
scrambling the polarization of the resulting wavelength division multiplexed signal light, wherein
N signal lights each have a different frequency, the signal lights being defined as a first through an Nth signal light as numbered in order along a frequency spectrum of the different frequencies, the even numbered signal lights having a first polarization and the odd numbered signal lights having a second polarization, the first polarization being different from the second polarization, and the step of combining includes
combining the even numbered signal lights to form a first wavelength division multiplexed signal light,
combining the odd numbered signal lights to form a second wavelength division multiplexed signal light, and combining the first and second wavelength division multiplexed signal lights to form the resulting wavelength division multiplexed signal light.

18. A method as in claim 17, wherein the first polarization is orthogonal to the second polarization.

19. An apparatus for scrambling a polarization of signal lights, comprising:

a polarization scrambling mechanism which scrambles the polarization of a signal light with a scrambling frequency; and a combining mechanism which combines the polarization scrambled signal light with at least one other signal light to form a wavelength division multiplexed signal light, wherein the polarization scrambling mechanism includes
a first polarization scrambler which scrambles the polarization of a first signal light with a first scrambling frequency, and
a second polarization scrambler which scrambles the polarization of a second signal light with a second scrambling frequency which is different from the first scrambling frequency, and the combining mechanism combines the first and second polarization scrambled signal lights to form the wavelength division multiplexed signal light.

20. An apparatus as in claim 19, wherein the polarization of the first signal light is different from the polarization of the second signal light before the first and second signal lights are scrambled by the first and second polarization scramblers.

21. An apparatus for scrambling a polarization of signal lights, comprising:

a polarization scrambling mechanism which scrambles the polarization of a signal light with a scrambling frequency; and a combining mechanism which combines the polarization scrambled signal light with at least one other signal light to form a wavelength division multiplexed signal light, wherein the polarization scrambling mechanism includes a plurality of polarization scramblers corresponding, respectively, to a plurality of signal lights, each polarization scrambler scrambling the corresponding signal light with a scrambling frequency which is different from the scrambling frequency of the other polarization scramblers, and the combining mechanism combines the plurality of polarization scrambled signal lights to form the wavelength division multiplexed signal light.

22. An apparatus as in claim 21, wherein each signal light of the plurality of signal lights has a different frequency, and respective signal lights are defined as being adjacent when the frequencies of the respective signal lights are adjacent to each other in a frequency spectrum without the frequency of a different signal light therebetween, and, for a respective signal light having an adjacent signal light and a non-adjacent signal light, a frequency difference exists between the scrambling frequency of the polarization scrambler corresponding to the respective signal light and the scrambling frequency of the polarization scrambler corresponding to the adjacent signal light, and a frequency difference exists between the scrambling frequency of the polarization scrambler corresponding to the respective signal light and the scrambling frequency of the polarization scrambler corresponding to the non-adjacent signal light, and the frequency difference between the scrambling frequency of the polarization scrambler corresponding to respective signal light and the scrambling frequency of the polarization scrambler corresponding to the adjacent signal light is larger than the frequency difference between the scrambling frequency of the polarization scrambler corresponding to the respective signal light and the scrambling frequency of the polarization scrambler corresponding to the non-adjacent signal light.

23. An apparatus as in claim 21, wherein each signal light of the plurality of signal lights has a different frequency, and respective signal lights are defined as being adjacent when the frequencies of the respective signal lights are adjacent to each other in a frequency spectrum without the frequency of a different signal light therebetween, and, before the polarization of the plurality of signal lights is scrambled by the plurality of polarization scramblers, the polarization of each signal light is different from the polarization of signal lights adjacent to the respective signal light.

24. An apparatus for scrambling a polarization of signal lights, comprising:

a polarization scrambling mechanism which scrambles the polarization of a signal light with a scrambling frequency; and a combining mechanism which combines the polarization scrambled signal light with at least one other signal light to form a wavelength division multiplexed signal light, wherein, before the polarization scrambling mechanism scrambles the polarization of the signal light, the polarization of the signal light has a polarization which is different from the polarization of at least one other signal light combined by the combining mechanism to form the wavelength division multiplexed signal light.

25. An apparatus for scrambling a polarization of signal lights, comprising:

a polarization scrambling mechanism which scrambles the polarization of a signal light with a scrambling frequency; and a combining mechanism which combines the polarization scrambled signal light with at least one other signal light to form a wavelength division multiplexed signal light, wherein the polarization scrambling mechanism includes
a plurality of polarization scramblers which scramble the polarization of a plurality of signal lights, respectively, at a scrambling frequency, the polarization of each signal light being scrambled at the same scrambling frequency, and the combining mechanism combines the plurality of polarization scrambled signal lights to form the wavelength division multiplexed signal light, where
each signal light of the plurality of signal lights has a different frequency, and respective signal lights are defined as being adjacent when the frequencies of the respective signal lights are adjacent to each other in a frequency spectrum without the frequency of a different signal light therebetween, and,
before the polarization of the plurality of signal lights is scrambled by the plurality of polarization scramblers, the polarization of each signal light is different from the polarization of signal lights adjacent to the respective signal light.

26. An apparatus as in claim 25, wherein the polarization of adjacent signal lights is orthogonal to each other.

27. An apparatus for scrambling a polarization of signal lights, comprising:

a polarization scrambling mechanism which scrambles the polarization of a signal light with a scrambling frequency; and a combining mechanism which combines the polarization scrambled signal light with at least one other signal light to form a wavelength division multiplexed signal light, wherein the polarization scrambling mechanism includes a first combiner which combines a first plurality of signal lights to form a first wavelength division multiplexed signal light, a second combiner which combines a second plurality of signal lights, different from the first plurality of signal lights, to form a second wavelength division multiplexed signal light, a first polarization scrambler which scrambles the polarization of the first wavelength division multiplexed signal light with a first scrambling frequency, and a second polarization scrambler which scrambles the polarization of the second wavelength division multiplexed signal light with a second scrambling frequency which is different from the first scrambling frequency, and the combining mechanism combines combining the polarization scrambled first wavelength division multiplexed signal light with the polarization scrambled second wavelength division multiplexed signal light, to produce a resulting wavelength division multiplexed signal light.

28. An apparatus as in claim 27, wherein each signal light of the first and second plurality of signal lights has a different frequency, and respective signal lights are defined as being adjacent when the frequencies of the respective signal lights are adjacent to each other in a frequency spectrum without the frequency of a different signal light therebetween, and, before the polarization of the first and second wavelength division multiplexed signal lights is scrambled by the first and second polarization scramblers, the polarization of each signal light of the first and second plurality of signal lights is different from the polarization of adjacent signal lights.

29. An apparatus as in claim 28, wherein, before the polarization of the first and second wavelength division multiplexed signal lights is scrambled by the first and second polarization scramblers, the polarization of each signal light of the first and second plurality of signal lights is different.

30. An apparatus as in claim 28, wherein, before the polarization of the first and second wavelength division multiplexed signal lights is scrambled by the first and second polarization scramblers, the polarization of each signal light of the first plurality of signal lights is the same and is defined as a first polarization, and the polarization of each signal light of the second plurality of signal lights is the same and is defined as a second polarization, the first polarization being orthogonal to the second polarization.

31. An apparatus for scrambling a polarization of signal lights, comprising:

a polarization scrambling mechanism which scrambles the polarization of a signal light with a scrambling frequency; and a combining mechanism which combines the polarization scrambled signal light with at least one other signal light to form a wavelength division multiplexed signal light, wherein N signal lights each have a different frequency, the signal lights being defined as a first through an Nth signal light as numbered in order along a frequency spectrum of the different frequencies the polarization scrambling mechanism includes a first combiner which combines even numbered signal lights to form a first wavelength division multiplexed signal light, a second combiner which combines odd numbered signal lights to form a second wavelength division multiplexed signal light, a first polarization scrambler which scrambles the polarization of the first wavelength division multiplexed signal light with a first scrambling frequency, and a second polarization scrambler which scrambles the polarization of the second wavelength division multiplexed signal light with a second scrambling frequency which is different from the first scrambling frequency and the combining mechanism combines the polarization scrambled first wavelength division multiplexed signal light with the polarization scrambled second wavelength division multiplexed signal light, to produce a resulting wavelength division multiplexed signal light.

32. An apparatus for scrambling a polarization of signal lights, comprising:

a polarization scrambling mechanism which scrambles the polarization of a signal light with a scrambling frequency; and a combining mechanism which combines the polarization scrambled signal light with at least one other signal light to form a wavelength division multiplexed signal light, wherein N signal lights each have a different frequency, the signal lights being defined as a first through an Nth signal light as numbered in order along a frequency spectrum of the different frequencies, the N signal lights including a plurality of even numbered signal lights having a first polarization, a plurality of even numbered signal lights having a second polarization, a plurality of odd numbered signal lights having the first polarization, and a plurality of odd numbered lights having the second polarization, the first polarization being different from the second polarization, the polarization scrambling mechanism includes a first combiner which combines even numbered signal lights having the first polarization to form a first wavelength division multiplexed signal light, a second combiner which combines even numbered signal lights having the second polarization to form a second wavelength division multiplexed signal light, a third combiner which combines odd numbered signal lights having the first polarization to form a third wavelength division multiplexed signal light, a fourth combiner which combines odd numbered signal lights having the second polarization to form a fourth wavelength division multiplexed signal light, a fifth combiner which combines the first and second wavelength division multiplexed signal lights to form a fifth wavelength division multiplexed signal light, a sixth combiner which combines the third and fourth wavelength division multiplexed signal lights to form a sixth wavelength division multiplexed signal light, a first polarization scrambler which scrambles the polarization of the fifth wavelength division multiplexed signal light with a first scrambling frequency, and a second polarization scrambler which scrambles the polarization of the sixth wavelength division multiplexed signal light with a second scrambling frequency which is different from the first scrambling frequency and the combining mechanism combines the polarization scrambled fifth wavelength division multiplexed signal light with the polarization scrambled sixth wavelength division multiplexed signal light, to produce a resulting wavelength division multiplexed signal light.

33. An apparatus for scrambling a polarization of signal lights, comprising:

a combining mechanism which combines first and second signal lights to form a resulting wavelength division multiplexed signal light, the first and second signal lights having different polarization; and a polarization scrambler which scrambles the polarization of the resulting wavelength division multiplexed signal light, wherein the combining mechanism combines a plurality of signal lights to form the resulting wavelength division multiplexed signal, each of the signal lights having either a first polarization or a second polarization, the first polarization being orthogonal to the second polarization.

34. An apparatus for scrambling a polarization of signal lights, comprising:

a combining mechanism which combines first and second signal lights to form a resulting wavelength division multiplexed signal light, the first and second signal lights having different polarization; and a polarization scrambler which scrambles the polarization of the resulting wavelength division multiplexed signal light, wherein the combining mechanism includes a first combiner which combines a first plurality of signal lights to form a first wavelength division multiplexed signal light, each signal light of the first plurality of signal lights having a first polarization, a second combiner which combines a second plurality of signal lights, different from the first plurality of signal lights, to form a second wavelength division multiplexed signal light, each signal light of the second plurality of signal lights having a second polarization which is different from the first polarization, and a third combiner which combines the first and second wavelength division multiplexed signal lights to form the resulting wavelength division multiplexed signal light.

35. An apparatus as in claim 34, wherein the first polarization is orthogonal to the second polarization.

36. An apparatus as in claim 34, wherein the polarization scrambler is defined as a main polarization scrambler, the apparatus further comprising:

a redundant polarization scrambler in parallel with the main polarization scrambler, for scrambling the resulting wavelength division multiplexed signal light when the main polarization scrambler fails.

37. An apparatus for scrambling a polarization of signal lights, comprising:

a combining mechanism which combines first and second signal lights to form a resulting wavelength division multiplexed signal light, the first and second signal lights having different polarization; and a polarization scrambler which scrambles the polarization of the resulting wavelength division multiplexed signal light, wherein N signal lights each have a different frequency, the signal lights being defined as a first through an Nth signal light as numbered in order along a frequency spectrum of the different frequencies, the even numbered signal lights having a first polarization and the odd numbered signal lights having a second polarization, the first polarization being different from the second polarization, and the combining mechanism includes a first combiner which combines the even numbered signal lights to form a first wavelength division multiplexed signal light, a second combiner which combines the odd numbered signal lights to form a second wavelength division multiplexed signal light, and a third combiner which combines the first and second wavelength division multiplexed signal lights to form the resulting wavelength division multiplexed signal light.

38. An apparatus as in claim 37, wherein the first polarization is orthogonal to the second polarization.

39. An apparatus for scrambling a polarization of signal lights, comprising:

a combining mechanism which combines first and second signal lights to form a resulting wavelength division multiplexed signal light, the first and second signal lights having different polarization; and a polarization scrambler which scrambles the polarization of the resulting wavelength division multiplexed signal light, wherein the polarization scrambler is defined as a main polarization scrambler, and the apparatus further comprises a redundant polarization scrambler in parallel with the main polarization scrambler, for scrambling the resulting wavelength division multiplexed signal light when the main polarization scrambler fails.

40. An apparatus comprising:

a plurality of signal light transmission sections which produce a plurality of signal lights, respectively, each signal light having a polarization; and a plurality of polarization scramblers respectively corresponding to the plurality of signal lights, each polarization scrambler scrambling the polarization of the corresponding signal light with a scrambling frequency which is different from the scrambling frequency of each of the other polarization scramblers, the polarization scrambled signal lights being combined together to form a wavelength division multiplexed light.

41. A method comprising the steps of:

scrambling the polarization of a first signal light with a first scrambling frequency;

scrambling the polarization of a second signal light with a second scrambling frequency which is different from the first scrambling frequency; and combining the first and second polarization scrambled signal lights into a wavelength division multiplexed signal light.

42. An apparatus comprising:

means for scrambling the polarization of a first signal light with a first scrambling frequency;

means for scrambling the polarization of a second signal light with a second scrambling frequency which is different from the first scrambling frequency; and means for combining the first and second polarization scrambled signal lights into a wavelength division multiplexed signal light.

\* \* \* \* \*